US012121771B2

(12) United States Patent
Hugmark et al.

(10) Patent No.: US 12,121,771 B2
(45) Date of Patent: *Oct. 22, 2024

(54) TRAJECTORY EXTRAPOLATION AND ORIGIN DETERMINATION FOR OBJECTS TRACKED IN FLIGHT

(71) Applicant: Topgolf Sweden AB, Danderyd (SE)

(72) Inventors: Joakim John Magnus Hugmark, Stockholm (SE); Daniel Forsgren, Enebyberg (SE); Anton Mikael Jansson, Stockholm (SE)

(73) Assignee: Topgolf Sweden AB, Danderyd (SE)

( * ) Notice: Subject to any disclaimer, the term of this patent is extended or adjusted under 35 U.S.C. 154(b) by 620 days.

This patent is subject to a terminal disclaimer.

(21) Appl. No.: 17/381,155

(22) Filed: Jul. 20, 2021

(65) Prior Publication Data

US 2023/0085842 A1 Mar. 23, 2023

Related U.S. Application Data

(63) Continuation-in-part of application No. 17/418,191, filed as application No. PCT/EP2021/051381 on Jan. 21, 2021, now Pat. No. 11,644,562.

(Continued)

(51) Int. Cl.
*A63B 24/00* (2006.01)
*A63B 67/02* (2006.01)

(52) U.S. Cl.
CPC .......... *A63B 24/0021* (2013.01); *A63B 67/02* (2013.01); *A63B 2024/0025* (2013.01);
(Continued)

(58) Field of Classification Search
CPC ................ A63B 24/0021; A63B 67/02; A63B 2024/0025; A63B 2024/0034;
(Continued)

(56) References Cited

U.S. PATENT DOCUMENTS 5,413,345 A 5/1995 Nauck
6,093,923 A 7/2000 Vock et al.
(Continued)

FOREIGN PATENT DOCUMENTS

WO WO1997028856 A1 8/1997
WO WO 2011106888 9/2011

OTHER PUBLICATIONS

Office Action in U.S. Appl. No. 17/418,191, dated Mar. 16, 2023, 17 pages.
(Continued)

*Primary Examiner* — Olumide Ajibade Akonai
(74) *Attorney, Agent, or Firm* — Fish & Richardson P.C.

(57) ABSTRACT

Methods, systems, and apparatus, including medium-encoded computer program products, for 3D flight tracking of objects include a method including determining a golf ball trajectory based on observations by sensor(s), extrapolating the trajectory backward in time, calculating distance measure(s) between the extrapolated trajectory and physical locations, determining one of the physical locations to be an origin of the golf ball based on the distance measure(s) and two types of separately estimated errors, wherein a first of the two types of separately estimated errors affects ball positional error for the initial observations, and a second of the two types of separately estimated errors affects an angle of the extrapolated trajectory; and presenting golf ball data on a display device associated with the origin of the golf ball.

24 Claims, 12 Drawing Sheets

Related U.S. Application Data

(60) Provisional application No. 62/964,095, filed on Jan. 21, 2020.

(52) U.S. Cl.
CPC ............... *A63B 2024/0034* (2013.01); *A63B 2024/0056* (2013.01); *A63B 2220/806* (2013.01)

(58) Field of Classification Search
CPC ...... A63B 2024/0056; A63B 2220/806; A63B 2102/32; G06T 2207/30224; G06T 2207/30241; G06T 7/20
See application file for complete search history.

(56) References Cited

U.S. PATENT DOCUMENTS

| | | |
|---|---|---|
| 6,320,173 B1 | 11/2001 | Vock et al. |
| 9,861,854 B2 | 1/2018 | Kuiper et al. |
| 9,977,114 B1 | 5/2018 | Hebert et al. |
| 10,238,943 B2 | 3/2019 | Vollbrecht et al. |
| 10,898,757 B1 | 1/2021 | Johansson et al. |
| 11,644,562 B2 | 5/2023 | Hugmark et al. |
| 11,771,957 B1 | 10/2023 | Hugmark et al. |
| 11,964,188 B2 | 4/2024 | Hugmark et al. |
| 2016/0059072 A1 | 3/2016 | Vollbrecht et al. |
| 2016/0306035 A1 | 10/2016 | Johnson |
| 2018/0011183 A1 | 1/2018 | Tuxen |
| 2018/0011184 A1 | 1/2018 | Du Toit et al. |
| 2019/0224552 A1 | 7/2019 | Kiraly et al. |
| 2019/0361107 A1 | 11/2019 | Tuxen |
| 2020/0139193 A9 | 5/2020 | Guerci et al. |
| 2020/0182999 A1 | 6/2020 | Du Toit et al. |
| 2021/0275873 A1 | 9/2021 | Johansson |

OTHER PUBLICATIONS

Office Action in U.S. Appl. No. 17/923,172, dated May 16, 2023, 10 pages.
Notice of Allowance in U.S. Appl. No. 17/923,172, dated Jul. 26, 2023, 9 pages.
Notice of Allowance in U.S. Appl. No. 18/236,854, dated Oct. 31, 2023, 10 pages.
Response to Office Action in U.S. Appl. No. 17/923,172, dated Jun. 21, 2023, 13 pages.
International Application No. PCT/EP2021/051381, Notification of Transmittal of the International Search Report and the Written Opinion of the International Searching Authority, mailed Apr. 20, 2021, 13 pages.
International Search Report and Written Opinion in International Appln. No. PCT/EP2022/067535, mailed on Oct. 13, 2022, 14 pages.

TRAJECTORY EXTRAPOLATION AND ORIGIN DETERMINATION FOR OBJECTS TRACKED IN FLIGHT

CROSS-REFERENCE TO RELATED APPLICATIONS

This application is a continuation-in-part application of, and claims the benefit of priority of, U.S. patent application Ser. No. 17/418,191, entitled TRAJECTORY EXTRAPOLATION AND ORIGIN DETERMINATION FOR OBJECTS TRACKED IN FLIGHT, which was filed on Jun. 24, 2021, and which is a U.S. National Stage Application of International Application No. PCT/EP2021/051381, which claims the benefit of priority of U.S. Provisional Patent Application No. 62/964,095.

BACKGROUND

This specification relates to tracking an object in flight, such as a golf ball, using data obtained from camera, radar, and/or other sensor devices.

U.S. Pat. No. 5,413,345 describes a golf shot tracking and analysis system in which range and locator cameras are positioned for viewing golf balls as they are struck or after they are in flight. As described in U.S. Pat. No. 5,413,345, a locator camera views the golf shot as it leaves the tee area, while a range camera views the shot from a generally perpendicular position down range. Moreover, a specific teebox origin of a ball in flight can be determined even when a camera is not able to "see" a ball on the tee. In addition, U.S. Patent Pub. No. 20180011183 describes a system for tracking multiple projectiles using radar, where one or more radar devices are positioned to maximize the field of view (beam coverage) of the radar device(s), each radar device can have its own associated computer to define its own three-dimensional radar coordinate system, and a central computer can follow the trajectory of each object backward to identify the hitting bay from which each object was launched.

SUMMARY

This specification describes technologies relating to tracking an object in flight, such as a golf ball, using data obtained from camera, radar, and/or other sensor devices, and in particular, to trajectory extrapolation and origin determination during full flight three dimensional (3D) tracking.

In general, one or more aspects of the subject matter described in this specification can be embodied in one or more systems that include two or more defined physical locations from which golf balls are hit into a three dimensional physical space; one or more golf ball sensors arranged with respect to the three dimensional physical space to detect the golf balls in flight after the golf balls are hit into the three dimensional physical space from the two or more defined physical locations; and one or more computers communicatively coupled with the one or more golf ball sensors, the one or more computers including at least one hardware processor and at least one memory device coupled with the at least one hardware processor, the at least one memory device encoding instructions configured to cause the at least one hardware processor to perform operations including determining a three dimensional trajectory for a golf ball in the three dimensional physical space based on initial observations of the golf ball by the one or more golf ball sensors, extrapolating the three dimensional trajectory of the golf ball backward in time to generate an extrapolated trajectory, calculating distance measures between the extrapolated trajectory and the two or more defined physical locations, waiting for additional observations of the golf ball by the one or more golf ball sensors when none of the distance measures satisfy a threshold distance. When only one of the distance measures satisfies the threshold distance, an error measure is formed for one of the two or more defined physical locations, which corresponds to the only one of the distance measures, from an estimated systemic error for at least one of the initial observations of the golf ball by the one or more golf ball sensors and an estimated stochastic error associated with the at least one of the initial observations of the golf ball by the one or more golf ball sensors, the one of the two or more defined physical locations is identified as an origin for the golf ball when the error measure satisfies a predefined criteria, and the one or more golf ball sensors wait for additional observations of the golf ball when the error measure does not satisfy the predefined criteria. When two of the distance measures satisfy the threshold distance, a first error measure is formed for a first of the two or more defined physical locations, which corresponds to a first of the two of the distance measures, from the estimated systemic error and the estimated stochastic error, a second error measure is formed for a second of the two or more defined physical locations, which corresponds to a second of the two of the distance measures, from the estimated systemic error and the estimated stochastic error, the first of the two or more defined physical locations is identified as the origin for the golf ball when the first error measure satisfies the predefined criteria and the second error measure does not satisfy the predefined criteria, the second of the two or more defined physical locations is identified as the origin for the golf ball when the second error measure satisfies the predefined criteria and the first error measure does not satisfy the predefined criteria, and the one or more golf ball sensors wait for additional observations of the golf ball when neither the first error measure nor the second error measure satisfies the predefined criteria. These and other embodiments can optionally include one or more of the following features.

The operations can include presenting golf ball tracking data on a display device associated with the defined physical location identified as the origin for the golf ball, and the presenting can include selectively presenting one or more metrics for the golf ball in flight in the three dimensional physical space based on the estimated systemic error, the estimated stochastic error, or both the estimated systemic error and the estimated stochastic error.

The selectively presenting one or more metrics can include: computing a measure of error for ball speed using the estimated stochastic error; and presenting, on the display device, a ball speed value calculated for the three dimensional trajectory for the golf ball when the measure of error for ball speed is below a threshold. The selectively presenting one or more metrics can include: computing a measure of error for a ball spin vector using the estimated systemic error and the estimated stochastic error; and presenting, on the display device, a ball spin value calculated for the three dimensional trajectory for the golf ball when the measure of error for the ball spin vector is below a threshold. The selectively presenting one or more metrics can include: computing a measure of error for launch angle using the estimated systemic error and the estimated stochastic error; and presenting, on the display device, a launch angle calculated for the three dimensional trajectory for the golf ball when the measure of error for launch angle is below a threshold.

Presenting the golf ball tracking data on the display device associated with the defined physical location identified as the origin for the golf ball can include presenting the one or more metrics at a different time than presenting a golf shot animation or a ball tracing overlay for the golf ball in flight in the three dimensional physical space.

Calculating the distance measures can include checking for intersections between the extrapolated trajectory and geometric shapes representing the two or more defined physical locations. The operations can include: determining hitting positions for two or more golfers to define the two or more physical locations from which golf balls are hit into the three dimensional physical space; and specifying locations of the geometric shapes using the hitting positions.

Determining the hitting positions can include using input from at least one electronic location system that communicates with mobile devices of the two or more golfers. Moreover, determining the hitting positions can include: locating a position of a mobile device of a given golfer using the at least one electronic location system; offsetting the position of the mobile device in a first direction responsive to the given golfer being right handed, to determine a hitting position for the given golfer; and offsetting the position of the mobile device in a second direction, which is opposite the first direction, responsive to the given golfer being left handed, to determine the hitting position for the given golfer.

One or more aspects of the subject matter described in this specification can be embodied in one or more methods and/or one or tangible computer-readable mediums (e.g., at least one memory device) and encode instructions configured to cause at least one hardware processor to perform the above operations.

In addition, one or more aspects of the subject matter described in this specification can be embodied in one or more methods and/or one or tangible computer-readable mediums (e.g., at least one memory device) and encode instructions configured to cause at least one hardware processor to perform operations including determining at least one three dimensional trajectory for at least one golf ball hit into a three dimensional physical space based on observations by at least one golf ball sensor placed adjacent to the three dimensional physical space; calculating systemic and stochastic errors for the at least one three dimensional trajectory in accordance with variations in golf ball launching position, variations in locations for the at least one golf ball sensor, or both; and presenting a report showing a summary of the calculated systemic and stochastic errors to indicate preferred hitting positions, a different location for the at least one golf ball sensor, or both. These and other embodiments can optionally include one or more of the following features.

The calculating can include calculating the systemic and stochastic errors for the at least one three dimensional trajectory in accordance with the variations in locations for the at least one golf ball sensor, the method/operations can include identifying at least one different location for the at least one golf ball sensor that produces lower systemic and stochastic errors, and the presenting can include presenting the report showing the summary of the calculated systemic and stochastic errors to indicate the at least one different location for the at least one golf ball sensor.

The method/operations can include moving the least one golf ball sensor to the at least one different location. The calculating can include calculating the systemic and stochastic errors in accordance with variations in parameters for the at least one golf ball sensor. The at least one golf ball sensor can be at least two golf ball sensors placed adjacent to the three dimensional physical space, and the method/operations can include preparing the report using lowest values of the systemic and stochastic errors, as calculated for the at least two golf ball sensors, for each available tee location.

The parameters can include field of view, the method/operations can include identifying different fields of view for the at least two golf ball sensors that are variations in initial fields of view which produce lower ones of the systemic and stochastic errors, and the presenting can include presenting the report showing the summary of the calculated systemic and stochastic errors to indicate the different fields of view for the at least two golf ball sensors. The method/operations can include adjusting the initial fields of view of the least two golf ball sensors to be the different fields of view.

The at least one golf ball sensor can include a camera, and calculating the systemic error can include estimating an intrinsic calibration error based on a focal length of the camera. The camera can be a stereo camera, estimating the intrinsic calibration error can include calculating a disparity for the stereo camera based on a distance between the stereo camera and a first observation, and calculating the systemic error can include estimating a stereo calibration error for the stereo camera as an estimated error in a calibrated rotation of the stereo camera. Further, calculating the stochastic error can include estimating a total random disparity error for an extrapolated trajectory, and adjusting a measure of error from the total random disparity error based on a distance from an initial observations to a baseline for the stereo camera. Finally, one or more aspects of the subject matter described in this specification can be embodied in one or more systems and/or apparatus that implement the above methods/operations.

Various embodiments of the subject matter described in this specification can be implemented to realize one or more of the following advantages. The origin of a tracked golf ball can be identified quickly, but also accurately, even when a golf ball tracking system is used to concurrently track golf balls originating from multiple different golf bays (or other defined physical locations), thus reducing the number of golf shots that are assigned to an incorrect originating location and/or cannot be assigned to an originating location until well after the golf shot has been hit. This can occur when the golf ball tracking system starts tracking the golf ball later than usual and at an angle that causes a good deal of error (e.g., disparity error in a stereo camera system which translates into an error in selecting the correct originating location.

To address this issue, an error associated with the first point in each trajectory for the detected golf shots can be estimated, and an assessment can be made regarding how that error affects the originating location selection. This can involve estimating the error in two parts: (1) a systemic error that affects the positional error in the same manner for the first point as for an extrapolated point back at the originating location, and (2) a stochastic error that affects an angle of the extrapolated trajectory produced from the points in each trajectory, which have random positional errors. The systemic error can be computed by estimating the vector-valued error of the position of the first observation of the trajectory, and projecting this value back to the selected originating location to determine how much of this error can affect the originating location selection. The stochastic error can be computed by estimating the angular error of the first observation of the trajectory to determine how this error can affect the backward extrapolation algorithm, and multiplying this error with the distance to the selected originating location to determine how this error can affect the originating location selection. With these two types of errors considered, the number of golf shots that are incorrectly assigned to an origin can be substantially reduced without increasing the delay (e.g., to wait for more data and/or new versions of the trajectory) before the golf shot is shown to the golfer.

In addition, the systemic and stochastic error calculations can be used to improve the performance of the object tracking system in unstructured environments. For example, in the case of a grass tee line on an open field or range, the systemic and stochastic error calculations can be used to identify the origins of golf shots that are hit by golfers standing very close together on a tee line. In addition, the systemic and stochastic error calculations can be used to improve the golfer's experience and/or to improve the object tracking system setup, thereby facilitating the deployment of an effective system with a minimum of sensors for a given range.

Furthermore, a separate, dedicated golf ball tracking system is not required for each originating location, which reduces costs in a system where multiple golfers are hitting golf balls simultaneously. Using fewer golf ball tracking systems at a site, such as a golf range, can reduce the work needed to administer the system and correct any hardware errors or repair breakdowns. Moreover, a wider field of view can be achieved, and less components need be placed near the golfers, e.g., in a golf bay. For example, there is no requirement for a golf ball tracking system using the systems and techniques detailed in this disclosure to have a tracking unit installed in each golf bay in a golfing entertainment facility. Moreover, fewer tracking systems reduces the overall complexity of the system from a software perspective, especially when a golf facility is entirely covered with only a single system.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
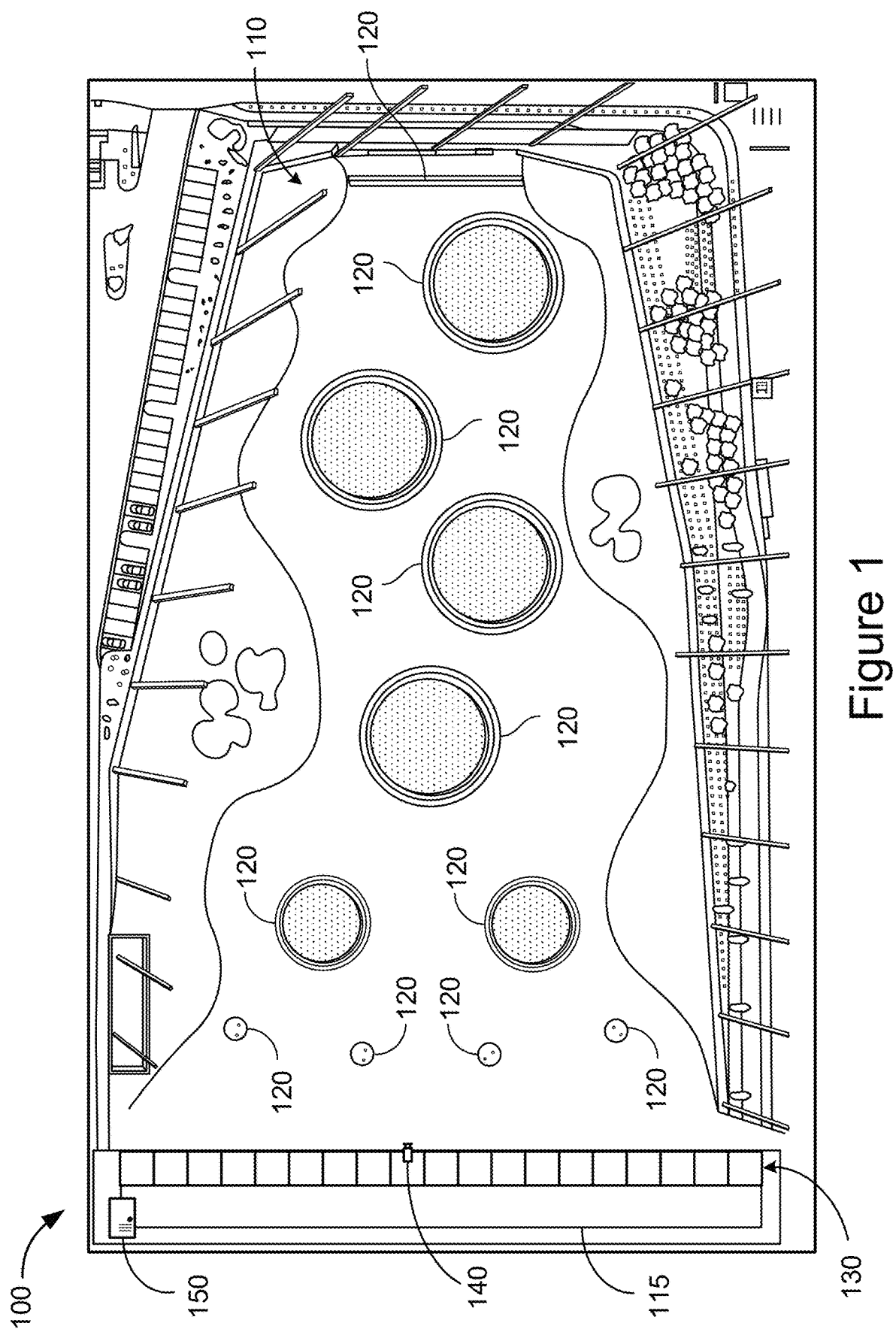
FIG. 1 shows an example of a system that performs in flight 3D tracking of golf balls through a three dimensional space.

FIG. 1 shows an example of a system 100 that performs in flight 3D tracking of golf balls through a three dimensional space. In this example, the system 100 is part of a golf facility that includes targets 120 on a golf range 110, and a building 115 including golf bays 130. In FIG. 1, the building 115 is shown as being rectangular, but note that typical implementations will have a curved portion of the building facing the golf range 110 so the golf bays 130 form a crescent shape. The targets 120 can include Radio Frequency Identification (RFID) tag interrogators that read RFID equipped golf balls hit from the golf bays 130 located on more than one level of the building 115. Further, one or more of the targets 120 can include discrete sections of netting that funnel the golf balls into respective RFID reader boxes associated with the different sections. However, in some implementations, no such RFID tags and RFID tag interrogators are required, as a golf ball sensor system 140, 150 can be used to track the golf balls in flight and identify where the golf balls land without the use of such RFID systems.

In the example of FIG. 1, the three dimensional space through which the golf balls are tracked is the golf range 110, which can be of various shapes and sizes, but will typically be 300-500 feet wide and 600-900 feet long. The golf range 110 can be flat or include small hills or one or more inclines, and can also include hazards, such as water and sand traps. Note that such hazards need not include actual water and sand, but can simply be colored to look like water and sand. The golf range 110 can be composed of real grass or artificial turf. Moreover, the targets can be grouped into categories that generally represent their distances from the building 115, and the targets can have various shapes, such as the circular shapes of the main targets and the rectangular shape of the trench target at the end of the range 110, as well as separate colors for each target 120 or groups of targets 120. Other shapes and sizes for the targets 120, as well as different numbers of targets 120 than shown, are also possible. However, in some implementation, no specific targets are required in the three dimensional space and/or no building is required. For example, the golf ball sensor system 140, 150 can be set up on an open field or in a sports stadium or arena.

In general, the golf ball sensor system 140, 150 is used to identify from which of multiple defined physical locations 130 the golf balls have been hit. The golf ball sensor system 140, 150 includes at least one golf ball sensor 140 and at least one computer 150 communicatively coupled with the golf ball sensor 140. The golf ball sensor 140 can be one or more sensors of one or more different types. For example, the golf ball sensor(s) 140 can be an optical sensor (e.g., a stereo camera or two cameras operated together to provide stereo vision of the golf balls in flight), a radar sensor, or a combination of these. In some implementations, two or more stereo cameras 140 are used to track golf balls in flight in three dimensional space. In some implementations, at least one golf ball sensor 140 is a sensor unit that integrates a radar device and a camera to track the golf balls in three dimensions, where the camera is used to provide angle information for the golf ball in a two dimensional plane, and the radar device is used to provide (in combination with the camera) depth information for the golf ball in a dimension perpendicular to the plane, e.g., for each in-flight camera observation of the golf shot, the radial distance to the golf ball is used to calculate a depth distance to the ball based on a camera angle for the in-flight camera observation (using a pinhole camera model, trigonometry, and a known separation distance between the camera and the radar device, which distance can be zero). Other sensor types and sensor data combinations are also possible, such as one or more phased array radar devices to determine angle and distance to the ball, which information can be converted to 3D locations, or two or more radar devices that combine their measured data to construct 3D flight trajectories.

The golf ball sensor(s) 140 are arranged with respect to the three dimensional physical space to detect the golf balls in flight after the golf balls are hit into the three dimensional physical space from the defined physical locations 130. In some implementations, the golf ball sensor(s) 140 are located such that it is not possible for the sensor to observe the golf balls at the moment of their launching from the defined physical locations 130. For example, the golf ball sensor(s) 140 can be attached to an awning above and in front of the golf bays 130, which can provide a wider field of view for the golf ball sensor(s) 140, while the systems and techniques detailed in this disclosure avoid any need to include a tracking unit inside a golf bay.

In some implementations, the golf ball sensor(s) 140 are located such that it is possible for the sensor to observe the golf balls at the moment of their launching from the defined physical locations 130. But as will be appreciated that, even with such positioning, each individual golf ball may not be detected until after the launch has already occurred, and thus sensor observations of the golf ball near the launch point may not be available in many cases. Thus, regardless of whether or not the golf ball sensor(s) 140 can observe the tee positions, the systems and techniques detailed in this disclosure can be used to determine a ball trajectory and to identify the location 130 from which each ball was launched.

The golf ball sensor(s) 140 are communicatively coupled with one or more computers 150. This can be a wired connection that allows the golf ball sensor(s) 140 to provide data to the computer(s) 150, a wireless connection that allows the golf ball sensor(s) 140 to provide data to the computer(s) 150, or a combination of these, and these connections can be simplex, duplex, or half-duplex connections. In some implementations, at least one computer 150 is connected or integrated with each of two or more sensors 140 to create discrete sensor systems, which independently/separately detect and track golf balls in the three dimensional space, thus providing distinct trajectory predictions based on distinct observations of the same golf balls traveling through the three dimensional space. As used herein, an "observation" is an identification of sensor data that is indicative of a golf ball based on predefined criteria, regardless of the type of sensor(s) being used.

Such discrete golf ball sensor systems can also be communicatively coupled with a central computer system 150, e.g., one or more server computer systems, which coordinate the trajectory predictions received from the discrete golf ball sensor systems and make a final determination as to which of the defined physical locations 130 should be confirmed and reported as the origin for a specific golf ball being tracked. Note that the central computer(s) 150 can be part of a computer system (e.g., for the golf facility) that manages golf games and sends information about the golf shot (e.g., a simulated golf shot animation in a virtual golf game and/or a ball tracing overlay in an augmented reality golf shot viewer) to a display device associated with the physical location 130. In any case, the computer(s) 150 include at least one hardware processor and at least one memory device coupled with the at least one hardware processor, that have been built and/or programmed to perform the operations detailed in this disclosure.

Moreover, the defined physical locations 130 can be golf bays, tee positions within golf bays, or tee positions generally. In some implementations, the three dimensional space is not a golf range, as shown. Thus, the defined physical locations 130 from which golf balls are hit can be designated hitting positions, e.g., as indicated by chalk, tape or ropes on the ground, and the three dimensional space can be any location in which is it is safe to hit golf balls, e.g., in a sports stadium or arena, or an open field that has been reserved for a golf event. For example, in some implementations, the three dimensional space is an open grass field, and the defined physical locations 130 are spots along a tee line chosen by individual golfers. As used herein, references to "golf bays" shall be understood as including tee areas or tee positions generally, unless explicitly described as an implementation that is limited to a golf bay that has more than one tee area within the golf bay.

Figure 2A:
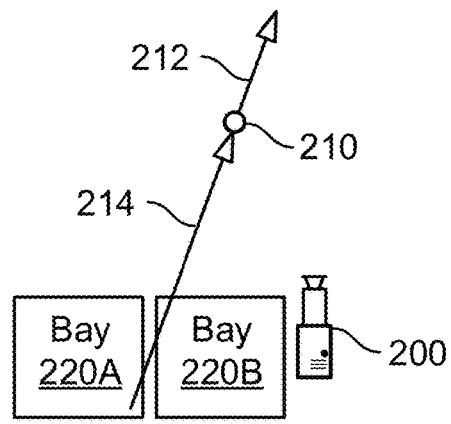
FIG. 2A is a schematic diagram of two golf bays, one of which will be identified by a golf ball sensor system as an origin for a golf shot.

FIG. 2A is a schematic diagram of two golf bays 220A, 220B, one of which will be identified by a golf ball sensor system 200 as an origin for a golf shot. The golf ball sensor system 200 is an example of the golf ball sensor system 140, 150 from FIG. 1. The golf ball sensor system 200 detects a golf ball 210, in flight, after it has been hit from one of two or more golf bays. From this initial observation of the golf ball and one or more subsequent observations of the golf ball, the system 200 determines a three dimensional trajectory 212 (note that the figure only represents two dimensions for clarity of illustration). The three dimensional trajectory 212 is then extrapolated backward in time to generate an extrapolated trajectory 214, which intersects both golf bay 220A and golf bay 220B. Thus, from the initial observations, it is not readily discernible which of the two golf bays 220A, 220B should be identified as the originating location of the golf shot.

Measuring and estimating the trajectory of a golf ball is useful in numerous applications to enhance the golfing experience. One example is driving ranges, where such processing of golf ball observations by sensor(s) is used to provide feedback and metrics to the golfer, but such processing is also useful for entertainment purposes, such as playing virtual golf courses and other games. In any case, when one golf ball sensor system 200 is used to track golf balls being launched from two or more golf bays 220A, 220B, e.g., to save the costs associated with having a dedicated sensor system for each golf bay, the system that estimates the trajectories should be able to handle multiple golfers simultaneously, and thus be able to distinguish which shot was hit by which golfer. In the example shown in FIG. 2A, the system 200 can wait for more observations of the golf ball 210 to improve the accuracy of the estimated trajectory, but this will delay the identification of the originating golf bay. In contrast, the sooner the system 200 identifies the originating golf bay for the golf shot, the more likely it will incorrectly identify which of the golf bays 220A, 220B is the originating golf bay, which is unacceptable from the user's perspective. This creates an undesirable trade-off between (1) unnecessarily delaying the identification of an originating golf bay for golf shots that have trajectories that are readily tracked backward to a single bay even when only a small number of observations have been made, and (2) incorrectly identifying an originating golf bay for golf shots that have trajectories that are more challenging to distinguish as originating from one of two adjacent golf bays. Using the systems and techniques described in this application enables the elimination of this undesirable trade-off, and thus both 1 and 2 can be avoided.

Figure 2B:
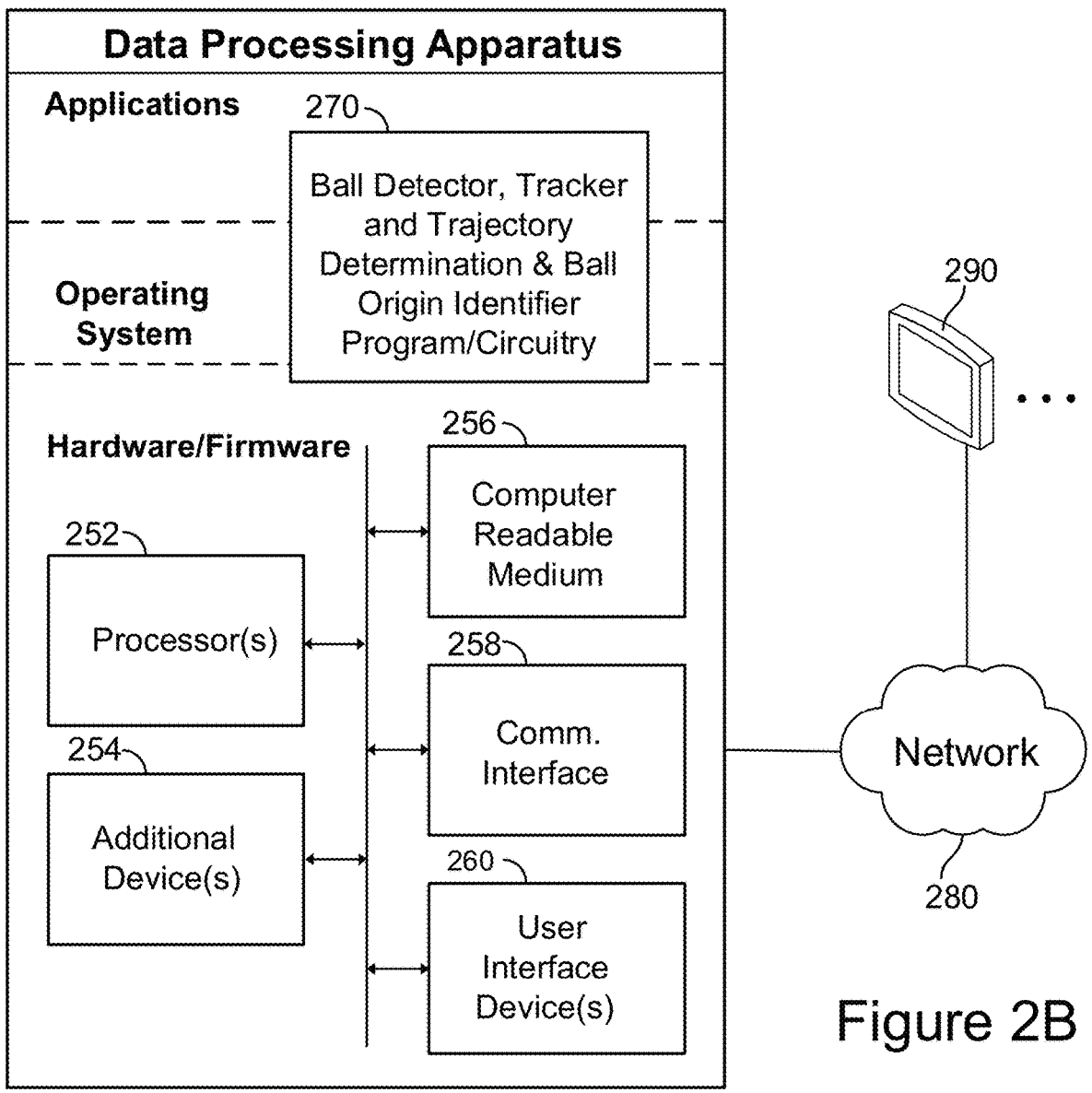
FIG. 2B is a schematic diagram of a data processing system that identifies a golf bay among two or more golf bays as the origin for a golf shot.

FIG. 2B is a schematic diagram of a data processing system including a data processing apparatus 250 that identifies a golf bay among two or more golf bays as the origin for a golf shot. The data processing apparatus 250 can be connected with one or more computers 290, display devices 290 or both, through a network 280. While only one computer is shown in FIG. 2A as the data processing apparatus 250, multiple computers can be used. Thus, one or more of the golf ball sensor system 140, 150, 200, 410, 420, 490, 500 from FIGS. 1, 2A, 4A, 4B, 5 and 6C can be implemented using data processing apparatus 250.

The data processing apparatus 250 can include various software modules, which can be distributed between an applications layer and an operating system. These can include executable and/or interpretable software programs or libraries, which can include a program 270 that operates as a 3D object flight tracking system. The number of software modules used can vary from one implementation to another, and the software modules can be distributed on one or more data processing apparatus connected by one or more computer networks or other suitable communication networks. Moreover, in some cases the functions described are implemented (in part or fully) in firmware and/or hardware of the data processing apparatus 250 to increase the speed of operation. Thus, program(s) and/or circuitry 270 can be used to implement a ball detector, tracker, and trajectory determination & ball origin identifier, as detailed in this disclosure.

The ball detector & tracker and trajectory determination & ball origin identifier program/circuitry 270 employs a physics modeler for golf ball flight to extrapolate the part of the trajectory that is outside the field of view of the sensor or missed by the sensor for other reasons. The data processing apparatus 250 can include hardware or firmware devices including one or more hardware processors 252, one or more additional devices 254, a computer readable medium 256, a communication interface 258, and one or more user interface devices 260. Each processor 252 is capable of processing instructions for execution within the data processing apparatus 250. In some implementations, the processor 252 is a single or multi-threaded processor. Each processor 252 is capable of processing instructions stored on the computer readable medium 256 or on a storage device such as one of the additional devices 254. The data processing apparatus 250 uses its communication interface 258 to communicate with one or more computers/display devices 290, for example, over the network 280. Thus, in various implementations, the processes described can be run in parallel or serially, on a single or multi-core computing machine, and/or on a computer cluster/cloud, etc.

Examples of user interface devices 260 include a display device, a touchscreen display device, a camera, a speaker, a microphone, a tactile feedback device, a keyboard, and a mouse. The data processing apparatus 250 can store instructions that implement operations detailed in this disclosure, for example, on the computer readable medium 256 or one or more additional devices 254, such as one or more of a floppy disk device, a hard disk device, an optical disk device, a tape device, and a solid state memory device. In general, computer readable medium 256 and one or more additional devices 254 storing instructions are examples of at least one memory device encoding instructions configured to cause at least one hardware processor to perform operations as detailed in this disclosure.

The additional device(s) 254 can also include one or more sensors 140, 410, such as when a sensor and computer are integrated together into a self-contained golf ball sensor system, e.g., systems 200, 490, 500, 660. The one or more sensors 140, 410 can also be located remotely from the data processing apparatus 250, and the data from such sensor(s) 140, 410 can be obtained using one or more communication interfaces 258, such as interfaces for wired or wireless technologies. Such communication interface(s) 258 can also be used to communicate an extrapolated trajectory, a proposed originating golf bay, a measure of confidence (one or more error measures) for the proposed originating golf bay, and/or other data to another computer system. For example, two or more data processing apparatus 250 can be discrete golf ball sensor systems that independently track golf balls in a three dimensional physical space, report their results to another data processing apparatus 250 that decides which result to use and which golf bay 220A, 220B to identify as the originating golf bay, and this information can be communicated to a computer/display device 290, which can be a display device located in the identified golf bay or a data processing apparatus 250 (e.g., a smartphone or tablet computer) held by a person located in the identified golf bay.

Figure 3A:
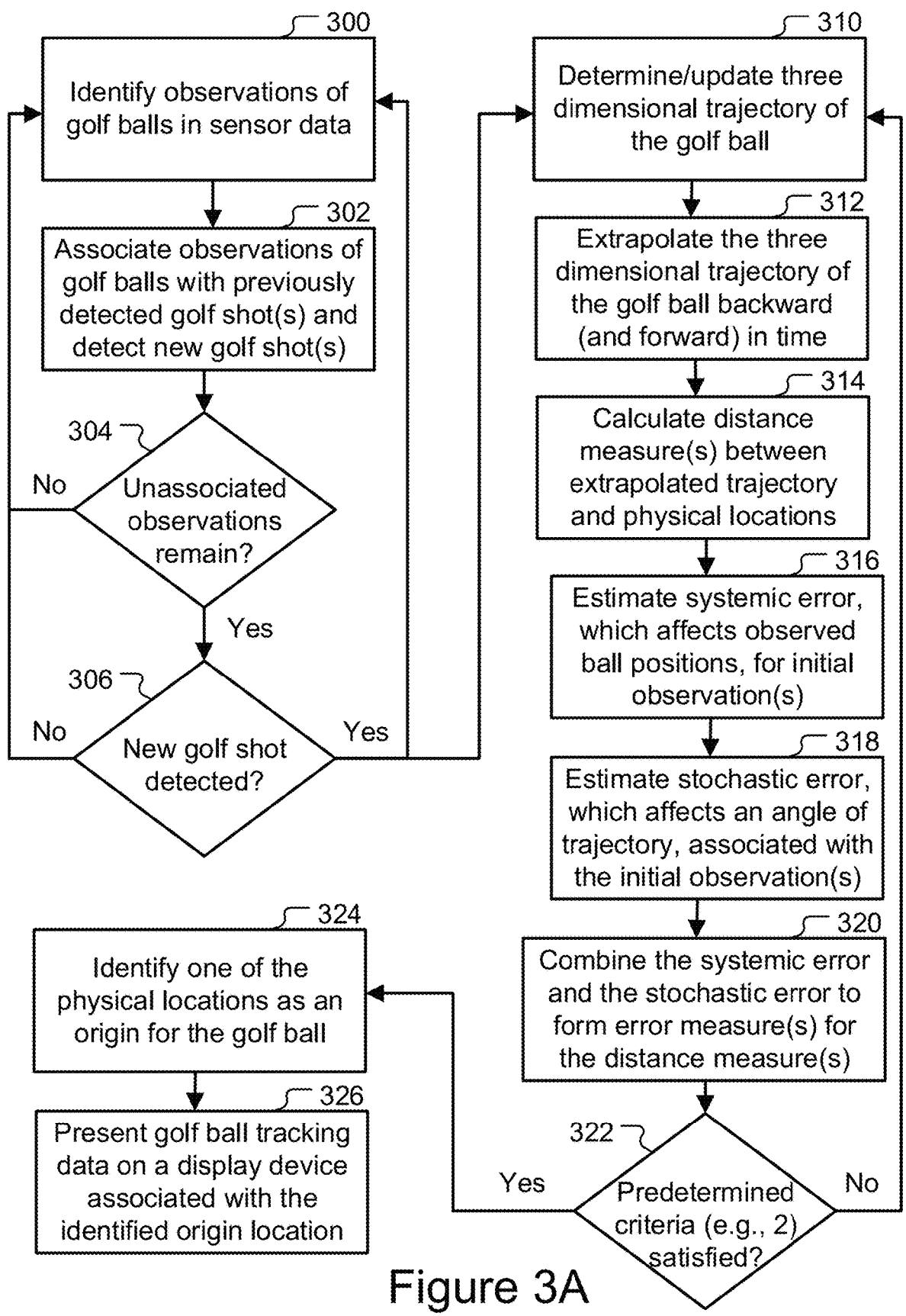
FIG. 3A is a flowchart showing an example of a process of locating an originating physical location of a golf ball detected and tracked in flight.

FIG. 3A is a flowchart showing an example of a process of locating an originating physical location of a golf ball detected and tracked in flight. Note that this is only an example; the operations described can be performed in a different order and still achieve desirable results. Observations of golf balls are identified 300 (e.g., by computer(s) 150, 200, 250, 420, 490, 500, 660) in sensor data. This involves processing the data received from one or more sensors (e.g., sensors 140, 200, 410, 490, 500, 660) to find data indicative of a golf ball based on criteria that has been predefined for the sensor type(s). For example, for radar data, ball speed criteria can be used in accordance with known speed ranges for golf balls that have just been hit or that correspond to an expected speed for a golf shot that was previously detected and is now being tracked. As another example, for camera data, streaming image data can be processed in real-time (e.g., using object classifiers) to identify various objects in the video stream that are candidate golf balls.

Observations of golf balls are associated with previously detected golf shots and new golf shots are detected 302 (e.g., by computer(s) 150, 200, 250, 420, 490, 500, 660). Note that the detection & association 302 and the identifying 300 can be performed together as sensor data of a golf ball in flight is received. This can involve simultaneous and/or concurrent processing using parallel processing or multi-tasking processor architectures. For camera data, a golf shot can be detected 302 when a series of candidate balls across a set of video frames meet or exceed one or more established criteria for a golf shot. In some implementations, analysis of the image data involves automated adjustment of one or more thresholds (e.g., an optimized threshold per pixel) to maximize sensitivity for objects of interest (e.g., objects that look like golf balls) as well as real-time filtering to enable detection of a golf shot before all the image data of the golf shot is received.

For radar data, a ball speed criteria can be used such that a radar time series can only start in a certain speed range, which corresponds to the range of speeds (e.g., 10-250 miles per hour) that are likely for a golf ball. Similarly, if range data is directly available from the radar sensor, objects detected outside a predefined range can be ignored. Additional criteria can be used across a series of radar measurements, as those measurements are received in real-time. For example, a radar measurements series of a golf shot should have decreasing speed over time, and this fact can be used to identify a golf shot in the radar data. Thus, golf balls detected at unexpected distances or speeds, as well other objects, such as birds and planes, can be readily ignored.

Moreover, when more than one sensor type is used, the data from the different sensor types can be used to enhance detection and tracking of golf shots. For example, when a golf shot is identified in radar data, a signal can be sent to trigger an adjustment of the one or more criteria used in analyzing the image data from a camera. This will cause the analyzing to favor selection of a set of object identifications that correspond to the golf shot, and thus increase the chances of identifying the golf shot. Note that interaction between the processing of the data from different sensor types (e.g., data from radar and camera devices) can go both ways to improve the robustness of the shot detection. By implementing more than one such cross-check of the data from different sensor types, the system can be made more robust on a driving range (or similar golf-themed entertainment location) with multiple golfers.

Note that when radar is used in combination with optical tracking, e.g., using the depth distance calculation described above, associating the radar ball speed with the correct optical track can involve designing or programming (e.g., by a mode setting) the radar device to report the speed of multiple objects with every measurement. Thus, rather than picking the fastest speed (or strongest reflection) and sending that speed only, the radar device can be set to report the speeds of the fastest objects, or the speeds of the objects with the strongest radar reflection. With such a mode of operation, some robustness to multiple balls in the air can be achieved with the following method: (1) identify the correct radar time series based on correlation in time, (2) for each new set of radar measurements, try all received speeds against the speed projected by the model, and (3) if any of the reported speeds fall within a threshold distance of the projected ball speed in the existing radar time series model, the value is added to the series, the model is updated and then the system will await the next set of measurements. Nonetheless, in some implementations, only one sensor type is used, e.g., two or more stereo camera systems.

The process continues to receive and analyze incoming sensor data to identify 300 ball observations while no unassociated observation remain 304 in the current sensor data. If ball observations are identified 300 but cannot be associated 302 with a previously detected golf shot, these ball observations continue being considered to try to detect 302 a new golf shot, and the process continues to receive and analyze incoming sensor data to identify 300 ball observations while unassociated observation remain 304 in the current sensor data but a new golf shot has yet to be detected 306. In addition, when a new golf shot is detected 306, a separate process can be spawned to determine an origin of the new golf shot. This separate process operates even while new sensor data is being received and analyzed to identify 300 additional golf ball observations and to associate 302 the new ball observations with the newly detected golf shot, which may or may not yet have an origin determined for that golf shot. In other words, the golf shot detection, golf shot origination determination, and golf ball flight tracking can all be performed for multiple golf balls concurrently, in real-time, while golf balls are still in flight and additional golf balls are being hit.

When a new golf shot is detected, a three dimensional trajectory for the golf ball in the three dimensional physical space is determined 310 (e.g., by computer(s) 150, 200, 250, 420, 490, 500, 660) based on the initial observations of the golf ball that have been identified 300. This can involve using a physics model for golf ball flight applied to three dimensional coordinates in the three dimensional space, as determined from the initial observations of the golf ball. Thus, at least the effects of gravity (e.g., drag, lift and gravity) can be taken into consideration, and other physical parameters, such as wind speed and direction, estimated ball spin, etc., can also be taken into consideration.

In some implementations, the physical modelling and extrapolation of the trajectory is done before the association of different shots. The physics model can be determined from all observations of the golf ball, not just the initial one(s). The physics model can include modelling the forces affecting the golf ball throughout the flight, including gravity, drag force and lift force, which are dependent on the environment, physical properties of the golf ball, wind speed and direction, ball speed and spin of the golf ball.

The three dimensional trajectory of the golf ball is extrapolated 312 (e.g., by computer(s) 150, 200, 250, 420, 490, 500, 660) backward (and potentially forward) in time to generate an extrapolated trajectory. But rather than simply finding an intersection between the extrapolated trajectory and a geometric shape that represents the golf bay, which can result in two intersection points as shown in FIG. 2A, one or more distance measures are calculated 314 (e.g., by computer(s) 150, 200, 250, 420, 490, 500, 660) between the extrapolated trajectory and the two or more defined physical locations. For example, each intersection point between the extrapolated trajectory and one or more geometric shapes (e.g., squares, rectangles, annular sectors, cubes, boxes, cuboids, 3D annular sectors, etc.) representing one or more golf bays can be calculated, and the distance between these intersection point(s) and the center point of each respective golf bay (or of a predefined tee area within the golf bay, or a main hitting position within the golf bay or tee area) can be calculated 314 as the distance measure(s).

As another example, the minimum distances between the extrapolated trajectories and exteriors of geometric shapes representing the golf bays (or predefined tee areas within the golf bays, or main hitting positions within the golf bays or tee areas), or between the extrapolated trajectories and center points of these geometric shapes can be calculated 314. Other distance measures are also possible, including combinations of two or more measurements, such as the average of the shortest distances between (1) the trajectory and the geometric shape's exterior, and (2) the trajectory and the geometric shape's center point. The distance measure(s) can also take into account the geometric relationship of the golf bays (or tee areas, or hitting positions) with reference to the current golf shot, such as when the last intersected geometric shape (from the modelled origination point of the golf shot) is considered to take precedence over the first intersected geometric shape.

Then, a measure of certainty for the calculated distance measure(s) can be determined in order to address the errors in the observation of the trajectory, as well as in the extrapolation of the trajectory back to the position of the golf bay, for use in deciding whether and when to identify a golf bay as the origin of the golf shot. This can be of particular importance when a golf shot's extrapolated trajectory intersects two bays with a similar distance to the center point of both bays, as shown in FIG. 2A, as it might be better to not display the shot at all than to display it to the wrong user, especially if there are two or more tracking systems at the site and another tracking system might soon provide better results. Thus, an estimation of the error in the extrapolated trajectory, e.g., at the point where it intersects the golf bay, can be computed so as to estimate the level of certainty for the originating golf bay, and the system can choose to not display the golf shot to the user if there is too much uncertainty regarding its origin.

Note that the error measure produced for a calculated 314 distance measure need not use that distance measure as input, but can do so in some implementations. For example, a first distance measure can be calculated to determine which golf bay to consider as the possible originating bay, and a second distance measure can be calculated for use in producing an error measure for that selected golf bay. Further, the one or more error measures can be calculated based on geometric relationships between (1) the at least one of the initial observations and the extrapolated trajectory, and (2) one or more of the two or more defined physical locations.

The error in the extrapolated trajectory depends on various properties of the tracking sensors, but to facilitate building a workable system that can rapidly produce informative estimates, the extrapolated trajectory error can be reduced to the following two types of errors: (1) systemic error, which affects observed ball positions, and (2) stochastic error, which affects an angle of a trajectory determined from the observed ball positions. Moreover, the system can estimate these two types of errors separately. The systemic error for at least one of the initial observations of the golf ball by the one or more golf ball sensors can be estimated 316 (e.g., by computer(s) 150, 200, 250, 420, 490, 500, 660), and the stochastic error associated with the at least one of the initial observations of the golf ball by the one or more golf ball sensors can be estimated 318 (e.g., by computer(s) 150, 200, 250, 420, 490, 500, 660). For example, the one or more golf ball sensors can include a stereo camera (one or more cameras) and estimating the systemic error can involve estimating an intrinsic calibration error based on a focal length of the camera and a disparity for the stereo camera, and estimating a stereo calibration error for the stereo camera as an estimated error in a calibrated rotation of the stereo camera.

Figure 3B:
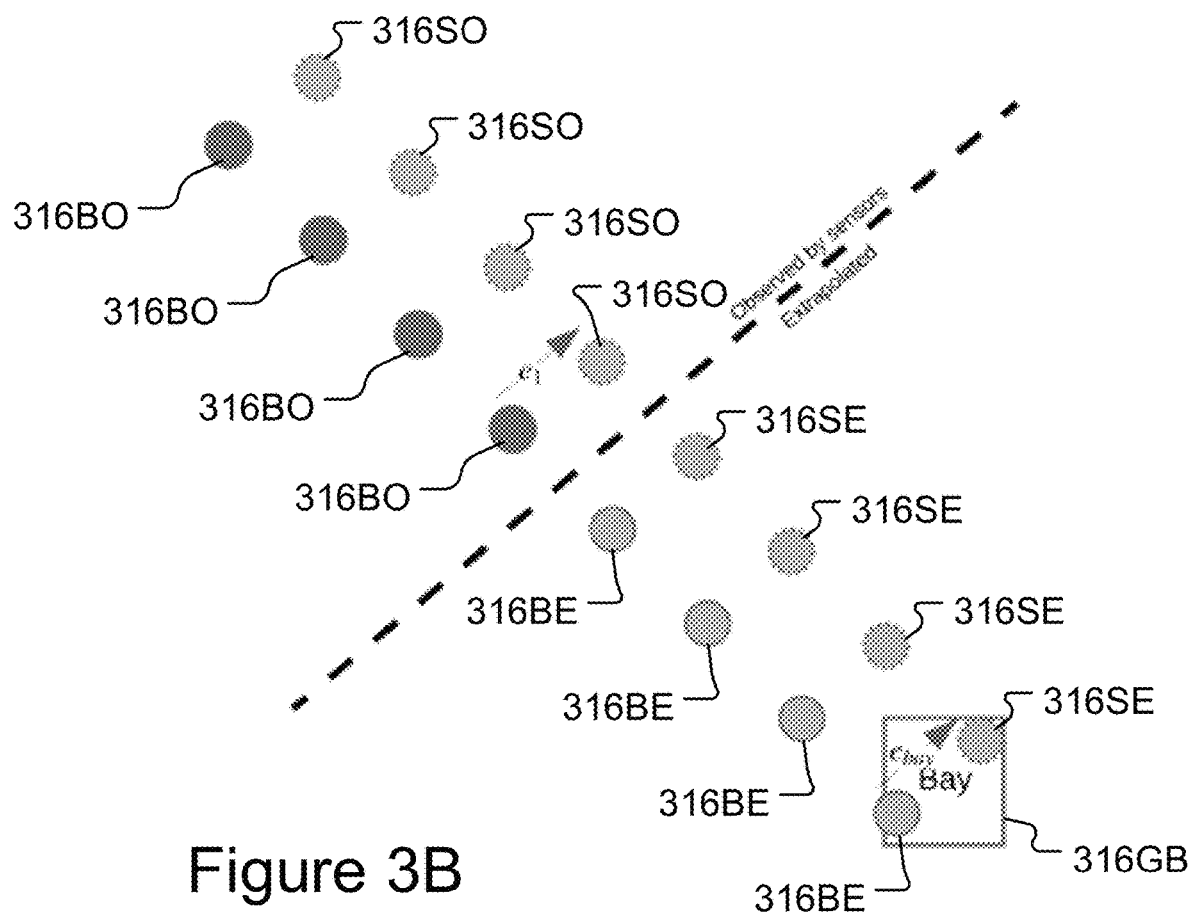
FIG. 3B shows an example of systemic error caused by errors in the tracking equipment and/or calibration of the tracking system.

FIG. 3B shows an example of systemic error caused by errors in the tracking equipment and/or calibration of the tracking system. The systemic error can be caused by errors when calibrating either the sensors themselves, or when the system is set up, e.g., when a system of sensors is calibrated together. For example, in the case of a stereo camera sensor system, the systemic error can be caused by the intrinsic calibration of each camera and also by the stereo calibration of each stereo system.

A systemic error will generally result in an offset of some kind and will affect two consecutive sensor readings in a similar way. This means the error in one observation is approximately equal to the error in the previous observation. Thus, as shown in FIG. 3B, the error between the actual positions 316BO of the ball observed by the sensor and the observed positions 316SO remains consistent, including in the extrapolated portion of the trajectory. Thus, this positional error remains the same between the unobserved actual positions 316BE of the ball and the extrapolated ball positions 316SE all the way back to the golf bay 316GB. Further, while the systemic error can be estimated for any observation 316SO of the golf ball, all that is needed is an estimate of the error vector $e_1$ for the first observation of the golf ball, and this error vector $e_1$ will be essentially equal to the error vector $e_{bay}$, which is the systemic positional error at the golf bay 316GB because the systemic error in the first (or later) golf ball observations will cause an error of similar size and direction at the golf bay, i.e., this error is independent of the extrapolation back to the golf bay 316GB.

Thus, an estimate of the systemic error can be calculated using the first, second, third, fourth, or later observations of the golf ball to determine an error vector, which can be presumed to be the same as the error vector of the position of the ball at the bay. This error vector can then be projected onto a directional vector that points along the row of adjacent golf bays to determine how the systemic error affects the selection of a golf bay as the originating golf bay for the golf shot. Thus, the geometric relationship between the golf bays and the current golf shot is taken into account.

A detailed example of this in the context of a stereo camera tracking system is now provided. Note that, in a stereo camera system, the positional error can be affected by the following source errors: (1) errors in the intrinsic calibration, and (2) errors in the stereo calibration. The error in intrinsic calibration can be understood as having the following effects in the stereo camera system: (1) error in the focal length, which error increases linearly from zero at the principal point of the image to some larger amount of error as one moves toward the edges (error proportional to the distance, r, to the principal point of the image); (2) error in the distortion coefficients, which error exhibits polynomial growth from zero at the principal point of the image to some larger amount of error (error proportional to $r^2+r^4$); and (3) error in the distortion model, which error increase and/or decreases non-linearly from zero at the principal point of the image to some other amount of error (error proportional to $f(x,y)$). In light of these factors affecting the error, to simplify the error model, the second and third of these two factors (polynomial increase and non-linear increase/decrease) can be ignored, and the error in the intrinsic calibration can be presumed to be zero in the middle of the image and increase linearly as one moves toward the edges of the image. Note that the system can employ a distortion model that attempts to eliminate all these errors. But some residual error is likely to remain in the system, as the distortion model and the attempts to remove distortion will not be perfect, and parts of this residual error will be more significant than other parts of this residual error.

Further, the error in stereo calibration can be understood as having the following effects in the stereo camera system: (1) error in the calibrated rotation of a camera, which error is approximately the distance from the camera to the point times the angular error of the rotation, and (2) error in the calibrated position of a camera, which error translates directly to the positional error of a point. Note that the second of these is likely to be very small and have negligible effect on the positional error in a given stereo camera implementation. Thus, the second of these effects can be safely ignored. It is the more significant parts of the residual error that should be addressed for their impact on selecting a golf bay as the source of a golf shot.

In the detailed example below, bold variables are vectors, the "hat" (^) symbol denotes a directional (unit) vector of length 1, |x| denotes the absolute value of x, ||a|| denotes the vector norm of a, × denotes the cross product between two vectors, and • denotes the scalar (dot) product between two vectors. The systemic error vector $e_1$ for one or more observations of the golf ball can be computed in accordance with the following equation:

$$e_1 = \left| r - \|b_{eff}\| \frac{f}{d + p_{err}} \right| \hat{b}_{eff} \times \hat{y} + re_{rot}\hat{b}_{eff} \quad (1)$$

where the first term corresponds to the intrinsic calibration error (note that the error caused by the disparity will be orthogonal to the effective baseline), the second term corresponds to the stereo calibration error (note that only the error of rotation is considered, and this stereo error will be mostly along the same direction as the effective baseline); r is the distance between the camera baseline and the first observed point; $b_{eff}$ is the effective baseline of the two cameras with respect to the first observed point; f is the (average) focal length of the two cameras; $e_{rot}$ is the estimated angular error of the camera(s) in the stereo calibration (determined experimentally for a given installation); $\hat{y}$ indicates the unit-vector along the y-axis; and where:

$$p_{err} = f \tan \frac{\sqrt{(x-s)^2 + (y-s)^2}}{\sqrt{(s^2/2)}} \hat{\alpha}_{err} \quad (2)$$

where α_hat_err is the estimated angular error of the intrinsic calibration at the corner of the image (determined experimentally for a given installation); x, y are the image coordinates of a golf ball observation; s is the sensor size of the camera. To obtain the affect that the intrinsic calibration error has on the actual position of the observation, it can be presumed that its biggest impact is propagating via an error in the disparity of the observation between the two cameras, thus resulting in an error in the distance between the camera baseline and the observed point. The relationship between the disparity and the distance is given by:

$$d = \|b_{eff}\| \frac{F}{r} \quad (3)$$

where F focal length f.

Figure 3C:
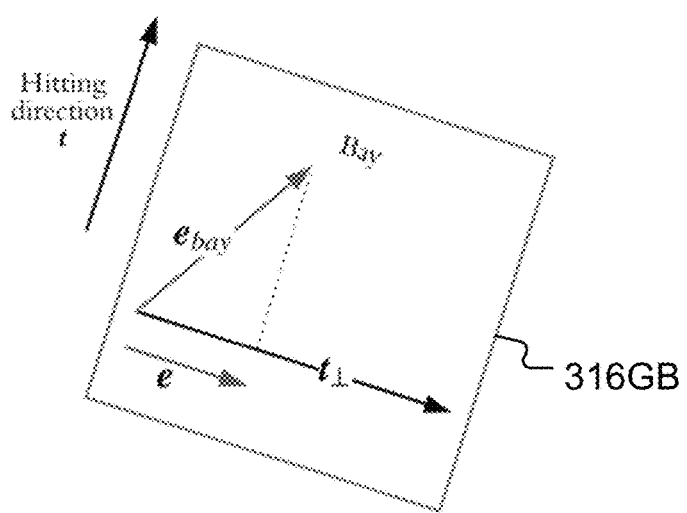
FIG. 3C shows an example of how systemic error affects the error of the estimation of whether a golf bay is the origin of a golf shot.

How much the error vector $e_1$ affects the error of the estimation of the golf bay is determined by the direction of the error vector $e_1$ compared to the (hitting) direction, as shown in FIG. 3C. In FIG. 3C, e is the part of the error vector $e_{bay}$ that affects the golf bay choice. This can be computed in accordance with:

$$e = \frac{t_\perp}{\|t_\perp\|} \cdot e_{bay} \quad (4)$$

where the hitting direction is computed as:

$$t_\perp = (p-a) \times \hat{y} \quad (5)$$

where p is the position of the first observation, and a is the position of the golf bay. Thus, to get the affect that this error has on the golf bay selection, the error vector is projected onto the line orthogonal to the direction of the golf shot, which can be defined by the vector between the golf bay and the first observation. Other estimations of the hitting direction are also possible. For example, the hitting direction can be determined during the installation of the system, where each golf bay is given a direction based on how that bay is oriented physically. As another example, the hitting direction can be determined by choosing a "main target" for each bay and using the vector from the bay to that main target as the hitting direction.

Figure 3D:
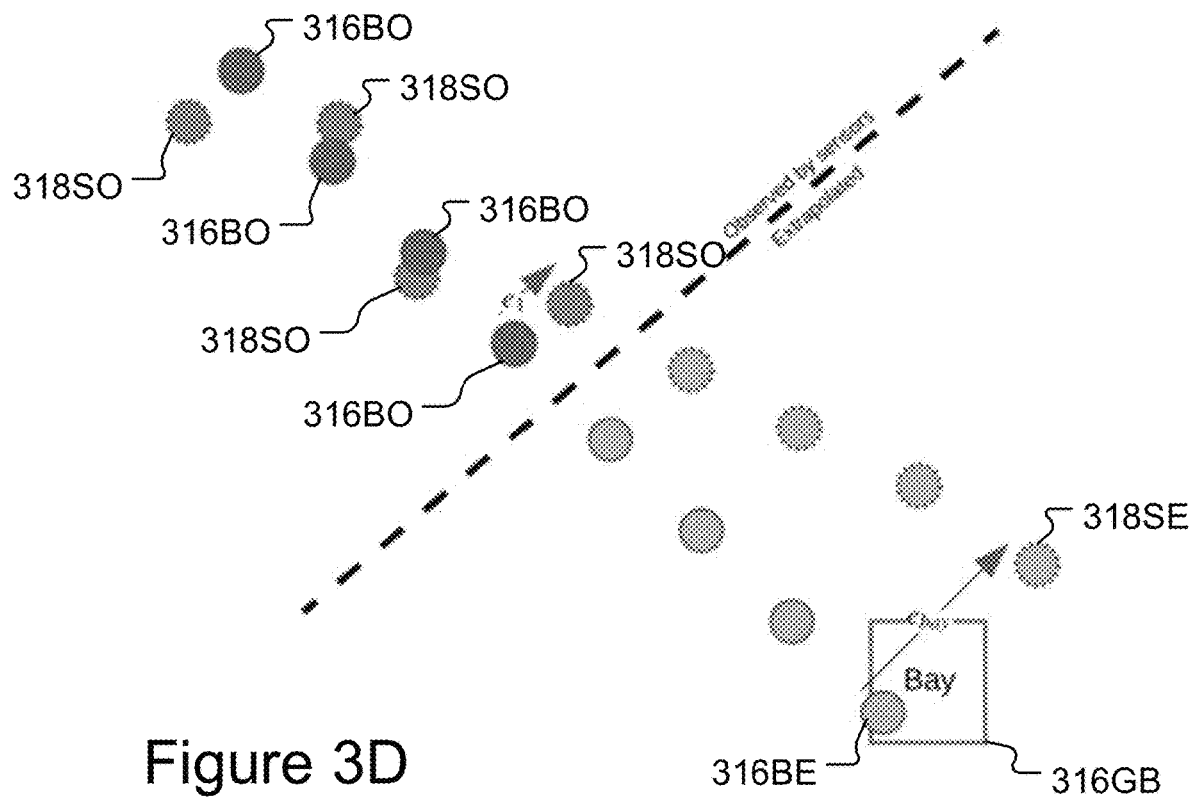
FIG. 3D shows an example of stochastic error caused by noise in sensor readings.

FIG. 3D shows an example of stochastic error caused by noise in sensor readings. The stochastic error can be caused by errors in the tracking of the golf ball, e.g., by noise present in the different tracking operations. For example, a stereo camera tracking system can have small random errors in the two dimensional (2D) tracking operations that cause a pixel error in the image coordinates of the observation of the golf ball, an error in the disparity, affecting the estimated depth (distance) to the golf ball, e_disp, and/or an error in the estimated direction to the golf ball, e_dir. This leads to an angular error between the first and last observed points, which will cause the physical model to perform its backwards extrapolation in a slightly wrong direction.

Thus, the stochastic error affects different parts of the observed trajectory differently, and the error of each observation of the golf ball is independent of the error in the previous observation. As shown in the example of FIG. 3D, the error between the actual positions 316BO of the ball observed by the sensor and the observed positions 318SO is not consistent. The extrapolation algorithm used to determine the trajectory of the golf ball is based on physical forces acting on the golf ball, and thus the algorithm tries to estimate the change in the golf ball's state between time steps. This means that it's more sensitive to relative errors between data points. Thus, this positional error between the unobserved actual position 316BE of the ball at the golf bay 316GB and the extrapolated ball position 318SE can vary significantly from the positional error between any given actual ball position 316BO and its observation 318SO.

As with the systemic error, the stochastic error estimation can begin with the first (or later) observed point. In general, the stochastic error can be estimated for any point in the trajectory, but in many implementations, the stochastic error estimation will begin with the first point in the trajectory, as the accuracy and usefulness of the data will likely decrease further away from the first observation of the golf ball. In any case, to get an idea of how this error affects the error of the extrapolated position at the golf bay 316GB, this error is converted to an angular error, since the extrapolation algorithm will be more affected by an angular error in the first point (or later points) than an offset (positional error). Moreover, the stochastic error is "angular" in the sense that this error will cause an error at the location of the golf bay 316GB that grows with the extrapolation distance.

In some implementations, this angular error is estimated in the following way: compute the magnitude, M, of the error vector $e_1$ for the first observation of the golf ball; determine how long, L, the golf ball has been observed (in either time or space); construct a function of L, f(L), which may be non-linear, to account for the fact that any more observations beyond a certain point won't help with the extrapolation; and then compute the angle, a, of the triangle with the sides M, f(L) and f(L). For example, f(L)=x*L/(y* (time_of_last_observation−time_of_first_observation)), where x, and y are variables determined experimentally.

This angle, a, is the angular error of the first (or later) observed point. This angle is then multiplied with the distance between the first (or later) observed point and the golf bay 316GB, to obtain the effect that this error has on the extrapolated position at the golf bay 316GB. The direction of this error can be presumed to be orthogonal to the direction of travel of the golf ball at the first (or later) observed position. Thus, this error vector $e_{bay}$ is also projected onto a vector that is orthogonal to the general hitting direction from that golf bay 316GB to determine how much this error affects the golf bay choice. Thus, the geometric relationship between the golf bays and the current golf shot is taken into account.

With reference to FIG. 3D, the stochastic error vector $e_1$ for the first observation of the golf ball can be computed in accordance with the following equations:

$$e_1 = e_{disp} + e_{dir} \quad (6)$$

$$e_{disp} = \left| r - \|b_{eff}\| \frac{f}{d + \tilde{p}_{err}} \right| \hat{b}_{eff} \times \hat{y} \quad (7)$$

$$e_{dir} = \frac{\tilde{p}_{err} r}{f} \hat{b}_{eff} \quad (8)$$

where r is the distance between the camera baseline and the first observed point; $b_{eff}$ is the effective baseline of the two cameras with respect to the first observed point; f is the (average) focal length of the two cameras; p̃_err is the estimated pixel error in the tracking (determined experimentally for a given installation), and ŷ indicates the unit-vector along the y-axis.

As for the systemic error, this error is converted to a positional error via the disparity formula, and since this error is also caused by a disparity error, the direction of the error is the same; see equation (7). Further, the random pixel errors can also affect the positional error in the direction orthogonal to the disparity. In this case, it is a directional error, and the size of that error is proportional to the distance from the baseline and can be computed via the pinhole camera formula; see equation (8).

As before, the part of this error that is of interest is the part that is orthogonal to the hitting direction. This can be computed in accordance with:

$$e_\perp = \frac{t_\perp}{\|t_\perp\|} \cdot e_1 \quad (9)$$

Figure 3E:
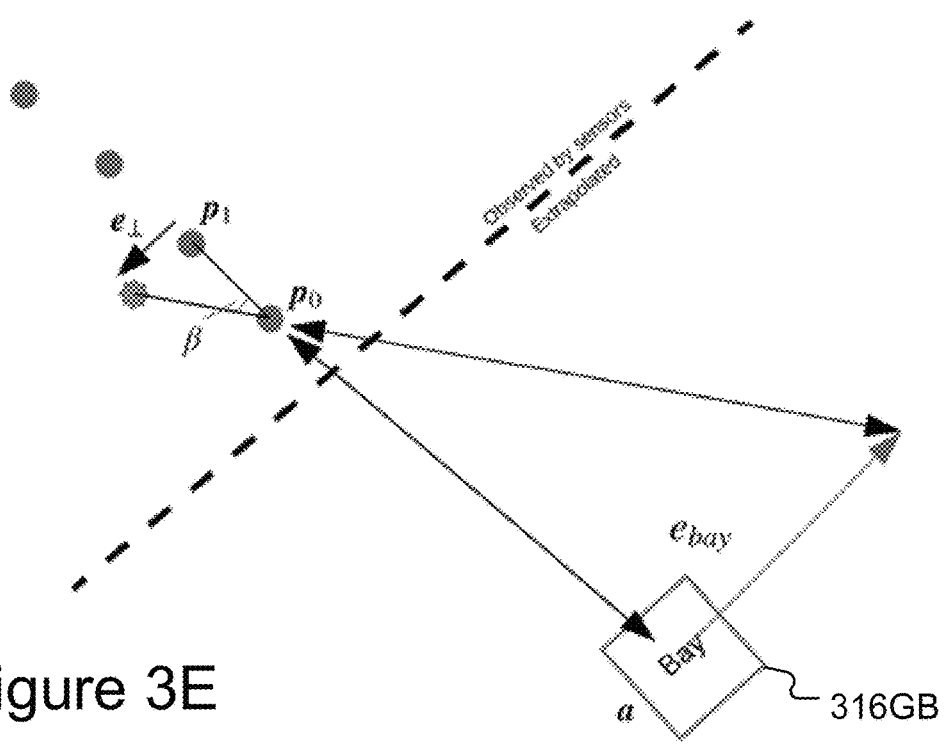
FIG. 3E shows an example of how stochastic error affects the error of the estimation of whether a golf bay is the origin of a golf shot.

Moreover, as noted above and as shown in FIG. 3E, this error will grow as the trajectory is extrapolated backwards. To estimate this growth in the error, the angle β is computed, where the angle β is defined as the angle between the two vectors: (1) between the first and second observations, $p_0$ and $p_1$, of the golf ball, and (2) between the first observed vector and the second observed vector added with the error $\tilde{e}_\perp$ along the $\tilde{t}_\perp$ direction:

$$\beta = \tan^{-1} \frac{\tilde{E}_{bay}}{\|p_1 - p_0\|} \quad (10)$$

Thus, the stochastic error at the location of the golf bay 316GB can be given as:

$$e_{bay} = \|(p_0 - a)\| \sin \beta \quad (11)$$

Note that the stochastic error estimation need not begin with exactly the first observed position of the golf ball, but rather can begin with the second, third, fourth or later observed positions. In general, the estimate of the stochastic error can be calculated using two or more of the first, second, third, fourth, and later observations of the golf ball (or using all the observations currently associated with an identified golf shot). In other words, it is also possible to take the number of observed points into account. In that case, the angle β isn't computed over $p_0$ and $p_1$, but between $p_0$ and $p_n$, where n is dependent on the number of available observations. Moreover, the error can also be added to $p_0$ instead of $p_1$, and the angle β at $p_1$ can be computed, which will provide a very similar result. Thus, the total random disparity error can be estimated, where it is presumed that errors in the 2D tracking is the only source of this error.

Another way to estimate how the angle β can affect the stochastic error at the bay is to construct a function f(β, r) that describes how the angular error β and the extrapolation distance r will affect the error at the bay. For example, f(a)=sin(β)*(r+z*r*r), where z is a quadratic factor of the angular error. The component sin(β)*z*r*r is a way to capture some of the non-linear effects the extrapolation may have on the error, where the value of z is determined experimentally. Other approaches to approximating how the extrapolation is affected by the angular error are also possible. But it should be noted that the relationship is not linear, i.e., just multiplying the angle with the distance, but rather is a more generalized function of the (angular) error and the extrapolation distance.

Other modifications are also possible. The computed error measure(s) can be adjusted based on the effective area of the golf bay, which can vary in dependence on the direction from the golf bay to the observed point and the geometrical shape of the golf bay. For example, if the geometric shape representing the golf bay is a rectangle, when this shape is seen from a perspective, the effective width of that rectangle shrinks. This can be taken into account by comparing the direction of the golf shot with the direction of the bay-rectangle and scaling the error accordingly:

$$e_{new} = e \div w_e \quad (12)$$

where $$w_e = (\sin\omega, 0, \cos\omega) \cdot \frac{p_0 - a}{\|p_0 - a\|} \quad (13)$$

where ω is the directional angle of the bay. Other adjustments based on the geometric relationships and/or layouts of the golf bays and/or the tee positions therein are also possible.

In general though, the separate treatment of the systemic error versus the stochastic error (same error at bay location versus growing error) provides an improved system performance, regardless of the specific golf bay geometry and the specific sources of the errors identified in a given implementation. When using sensors of different types, e.g., radar sensors versus stereo camera sensors, the equations for computing the actual errors will differ, but how the different types of errors affect the bay choice will be generally the same. For instance, using a FMCW (Frequency-Modulated Continuous-Wave) radar, the expected errors are similar to those of a stereo camera pair. Systematic error in angle to the ball as well as range can be expected. Furthermore, a stochastic error for angle and range can also be expected. This is true for all data points in a trajectory measured by radar. Thus the same or very similar error propagation can be used to determine bay error in a radar based system.

Returning to FIG. 3A, the estimated systemic error and the estimated stochastic error can be combined 320 (e.g., by computer(s) 150, 200, 250, 420, 490, 500, 660) to form one or more error measures for the one or more distance measures. For example, the estimated systemic error and the estimated stochastic error can be added together. Other combination are possible. Adding the two errors together is a way of estimating the "worst case" scenario, i.e., that both errors affect the observation/measure in the same direction. If one can show that this isn't the case, then the errors can be combined differently. In addition, the combination 320 can take into account the geometric relationships between (1) the at least one of the initial observations and the extrapolated trajectory, and (2) one or more of the two or more defined physical locations, as well as the geometrical shape and/or layout of the golf bay and/or the tee position(s) therein.

A check is made 322 (e.g., by computer(s) 150, 200, 250, 420, 490, 500, 660) as to whether the one or more error measures satisfy a predefined criteria. When the one or more error measures do not satisfy 322 the predefined criteria, the process can wait for additional observations of the golf ball by the one or more golf ball sensors. Thus, the process can return to update 310 the three dimensional trajectory for the golf ball in the three dimensional physical space based on new observations of the golf shot. For example, if the total error is higher than a certain threshold, the identified golf shot is not immediately displayed to the user, since if the same (or another, redundant) system provides a newer version of that golf shot with a lower error, within a short timeframe, the first version can safely be discarded. Note that FIG. 3A shows that the systemic error and the stochastic error are also recalculated 316, 318, but in some implementations, one or both of the systemic error and the stochastic error need not be recalculated for the updated trajectory, depending on the specifics of how these error measures are calculated in a given implementation.

For example, as described above, the systemic error can be the same as that calculated previously, so an updated calculation is not needed when the updated trajectory does not change the systemic error. In contrast, the stochastic error can be recalculated 318 on the second and any subsequent error estimates for the updated trajectory, as this portion of the error can change substantially as new ball observations are received from the sensor(s). In some implementations, the length of the complete observed trajectory can be used as input to the error equation, and so the information from the additional observations is also used. Thus, each recalculation 318 can use information about the whole trajectory to compute the complete, combined 320 error of the starting position of the ball at the golf bay.

In addition, the predetermined criteria that is checked 322 can be a single criteria, e.g., a single error threshold, or two or more criteria. For example, in the case where two error measures are determined for two respective golf bays, and both of these error measures fall below the error threshold, the two error measures can be compared 322 with each other to identify the golf bay corresponding to the lower error measure as the origin for the golf shot. As another example, in a multi-detector system, after a certain amount of time in which no other detection system has picked up that golf shot, the first detector of the golf shot can have its tracked trajectory tested against a more lenient error threshold, to give a better chance of identifying an originating golf bay for the golf shot.

For example, using the combined error calculated in equation (12), the first version of a golf shot detected by a stereo camera golf ball tracking system can be compared to a threshold of 0.15, whereas the second and subsequent versions of the golf shot detected by that same stereo camera golf ball tracking system can be compared to a threshold of 0.25. As another example, the stricter threshold (e.g., 0.15) can be applied to only the very first version of a golf shot detected by any of two or more golf ball tracking systems, and all subsequent versions of the golf shot (detected by any of the two or more golf ball tracking systems) can have the more lenient threshold (e.g., 0.25) applied. Using such a two level criteria at 322 allows first-versions of golf shots (e.g., from a non-primary system for that golf bay rather than from a primary system for that golf bay) to only be accepted if the error in the golf bay selection is very low, thus further reducing latency for golf bay selection in some cases, without risking an incorrect golf bay selection in the more typical cases.

Figure 4A:
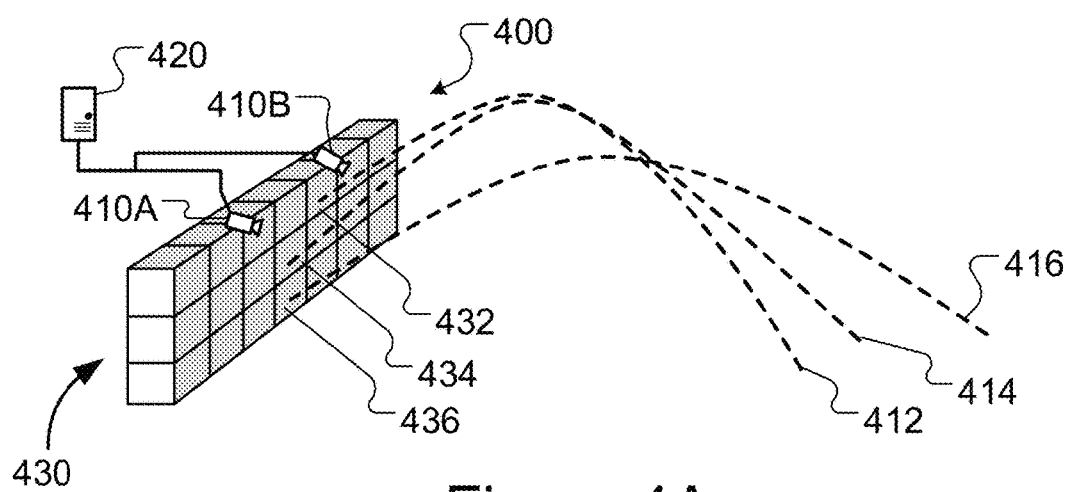
FIG. 4A shows another example of a system that performs in flight 3D tracking of golf balls through a three dimensional space.

FIG. 4A shows an example of a system 400 that performs in flight 3D tracking of golf balls through a three dimensional space. Two or more sensors 410 are communicatively coupled (wired connection(s), wireless connection(s), or both) with a computer system 420. The number of sensors 410 used will vary with the size of the three dimensional space to be covered, but in general, a set of sensors 410 are installed so as to cover the whole three dimensional space (e.g., the whole driving range). In addition, the number of sensors 410 can be increased to provide redundancy of coverage for the space, e.g., having at least two sensors 410 covering each golf bay. In the example of FIG. 4A, for clarity in this description, only two sensors 410A, 410B are shown, and each sensor 410 covers all golf bays 430 located in three tiers.

As shown, the golf bays 430 are 3D spaces within a building, e.g., the building 115 in FIG. 1. As this is a 3D structure, the geometric shapes that represent the golf bays 430 in the golf ball tracking system can also be three dimensional (with width and height) to be able to identify originating golf bays on different floors of the building. Moreover, each sensor 410 (or a combination of sensors 410A, 410B) tracks all golf balls within its field of view, and a physics model for golf ball flight (operating in the computer system 420) is used to extrapolate the part of the trajectory that's outside the field of view or missed by the sensor for other reasons. Note that a single sensor 410A can have multiple sensor components, as in the case of a stereo camera, which can have two optical sensors in it but output one signal. In addition, even when multiple sensors 410A, 410B, share computer hardware 420 (as shown) rather than having dedicating processing hardware, the sensor-and-computer combinations 410A, 420 and 410B, 420 can be discrete sensor systems that independently identify golf shots, extrapolate each identified golf shot both forward and backward in time, and attempt to determine the originating golf bay based on the backward extrapolation of the golf shot. An orchestrating process, which can also run in computer 420 or another computer, can take the data from these discrete sensor systems and make a final determination regarding which golf bay to identify as the origin of a particular golf shot.

Using the extrapolated trajectories, the system calculates from which physical location each golf ball was hit, so that the 3D tracking of the golf ball can be displayed to the correct person in the correct golf bay. For example, a first discrete golf ball sensor system 410A, 420 can identify the initial observations of a golf shot 412 and detect the golf shot 412, but not have enough confidence in the initially identified originating bay (a first error threshold is not satisfied) to cause the golf shot 412 to be displayed in any of the golf bays 430. Then, the additional observations of the golf shot 412 can be obtained by the first discrete golf ball sensor system 410A, 420 before a second discrete golf ball sensor system 410B, 420 has even detected the golf shot 412. Thus, the updating of the 3D trajectory based on the additional observations, the extrapolating of this updated trajectory backward in time, the calculating updated distance measure(s), any updated error estimations (e.g., updating the stochastic error using the entirety of the currently observed trajectory), and the combining of the estimated systemic error and the estimated stochastic error to form updated error measure(s) for the updated distance measure(s) can all occur before the second discrete golf ball sensor system 410B, 420 has detected the golf shot 412.

After this updating, the first discrete golf ball sensor system 410A, 420 can identify a golf bay 432 as the origin for the golf shot 412 when the updated error measure(s) satisfies the predefined criteria, e.g., a second, easier error threshold (than used for the first check) is satisfied. Using such an easier error threshold in this case is advantageous as the second discrete golf ball sensor system 410B, 420 may in fact never detect the golf shot 412. Moreover, even if later versions of the golf shot 412 obtained by the first system 410A, 420, do not improve substantially in the error measure(s), those later versions will be considered again with the more lenient threshold, to help ensure an originating golf bay is identified for all golf shots. In other words, if no additional observations are available within a certain pre-defined time, the initial observations (along with any additional observations) can be processed and compared to another (less strict) pre-defined criteria. In some implementations, more than two thresholds are used across pre-determined time horizons.

In some implementations, multiple systems track the golf ball simultaneously and deliver new versions at specified intervals. A stricter threshold is used for the first version of a detected golf shot, which means a second tracking system will have time to deliver its first version before the first tracking system delivers its second version of the golf shot. Only if the first version from a system passes the stricter threshold, will that version of the golf shot be used to decide the originating golf bay. This facilitates keeping down the latency, while also ensuring that the bay choice will not be based on an inaccurate shot version if a better one will soon be provided.

For example, the first system 410A, 420 can identify the initial observations of a golf shot 414 and detect the golf shot 414, but not have enough confidence in the initially identified originating bay (a first error threshold is not satisfied) to cause the golf shot 414 to be displayed in any of the golf bays 430. Then, the additional observations of the golf shot 414 can be obtained by the second system 410B, 420 and the same golf shot 414 can be detected by the second system 410B, 420 while the first system 410A, 420 continues tracking the golf shot 414. The second system 410B, 420 can determine a discrete three dimensional trajectory for the golf ball in the three dimensional physical space based on the additional observations, extrapolate the discrete three dimensional trajectory of the golf ball backward in time, calculate discrete distance measure(s) between the discrete extrapolated trajectory and golf bay 434 and golf bay 436, estimate a discrete systemic error and a discrete stochastic error, combine the discrete estimated systemic error and the discrete estimated stochastic error to form discrete error measure(s) for the discrete distance measure(s), and identify one of golf bay 434 and golf bay 436 as the origin for the golf shot 414 when the first error threshold is satisfied.

Thus, between the time that the first system 410A, 420 initially detects the golf shot 414 and later uses the less strict error threshold to decide between golf bay 434 and golf bay 436 as the origin for golf shot 414, the second system 410B, 420 can both detect the golf shot 414, and due to its position relative to the ball's trajectory, accurately identify the golf bay 434 as the originating golf bay. Also note that, while this is happening, a concurrent process can be occurring, in which the second system 410B, 420 initially detects a golf shot 416, but doesn't have sufficient confidence to identify one of golf bay 434 and golf bay 436 as the origin, but then the first system 410A, 420 subsequently also detects the golf shot 416 and has less error that affects golf bay selection for the golf shot 416 (due to the geometric relationships among the trajectory of the golf shot 416, the position of sensor 410A, and the locations of the golf bays 434, 436) so the first system 410A, 420 can quickly identify the golf bay 436 as the origin for the golf shot 416.

Returning to FIG. 3A, when the one or more error measures do satisfy 322 the predefined criteria, one of the two or more defined physical locations is identified 324 (e.g., by computer(s) 150, 200, 250, 420, 490, 500, 660) as an origin for the golf ball. The identified origin is then used as input for further processing (e.g., by computer(s) 150, 200, 250, 420, 490, 500, 660) such as by using the identified origin to facilitate further tracking of the golf ball in flight and/or presenting 326 (e.g., by computer(s) 150, 200, 250, 420, 490, 500, 660) golf ball tracking data on a display device associated with the identified originating location. Various types of display devices can be used and can be positioned at different physical locations, e.g., within various golf bays in a building.

Further, each of the golf bays in a building, e.g., the building 115 in FIG. 1, can be the same, or there can be different levels of accommodation for different types of golf bays, as well as different shapes, sizes and layouts. The golf bays on a first level can have direct access to the golf range, whereas golf bays on higher levels will typically have safety netting extending horizontally away from the building to prevent injury should someone accidentally fall out of the front of the bay. In addition, each golf bay can include one or more tee off locations.

Figure 4B:
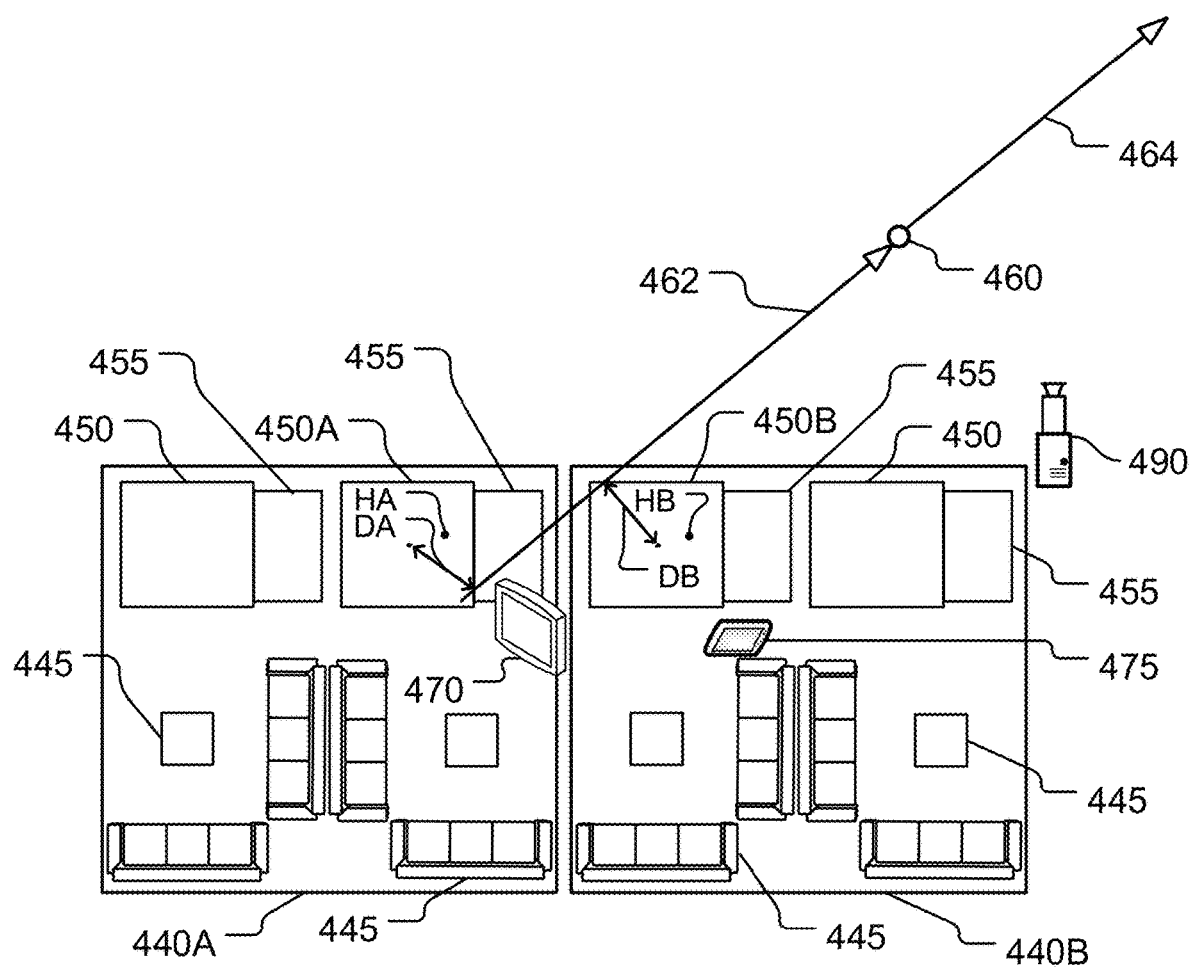
FIG. 4B shows an example of a system that performs in flight 3D tracking of a golf ball in relation to a layout for golf bays, as can be used in the system of FIG. 4A.

FIG. 4B shows an example of a system that performs in flight 3D tracking of a golf ball in relation to an example of layouts for two golf bays 440A, 440B, as can be used in the system of FIG. 4A. The golf bays 440A, 440B can include furniture 445, such as couches and tables, to facilitate dining and conversation during the game. As will be appreciated, many layouts for the furniture 445 are possible, and the furniture 445 and layout in the golf bays 440A, 440B can be designed to provide flexibility in how the golf bays 440A, 440B are assigned to one or more groups of people for playing games together or separately.

Each of the golf bays 440A, 440B can include two tee off locations, where each tee off location includes a tee area 450 and a golf ball dispenser 455. Each golf ball dispenser 455 can be directly connected with a pneumatic tube system, such that golf balls can be automatically retrieved from the targets and fed back to the players without human intervention. Alternatively, the golf balls can be collected from a central location in the building, e.g., the building 115 in FIG. 1, and manually dropped into a receptacle in golf ball dispenser 455.

The two golf bays 440A, 440B can share an electronic hub, which can include various power lines and cables to support separate display devices for each golf bay, such as display device 470, which can include computer processors or be dumb terminals that are communicatively coupled (with wires, wirelessly, or both) with computer processors that control what is presented on each display device. In some implementations, no shared electronic hub is included, and the display devices are individually associated with a respective golf bay 440A, 440B, a respective tee area 450 or a dispenser 455 within a golf bay 440A, 440B, and/or with a respective person within a golf bay 440A, 440B, such as a portable electronic device 475, e.g., a smartphone or tablet computer. Each display device can include a touch screen device that connects with a central computer system for the building, e.g., the building 115 in FIG. 1, and provides the players with direct control over their game play, including selecting the type of game to play and the current player.

In any case, one or more players can step into respective tee areas 450, obtain a golf ball from a respective dispenser 455, and then hit their respective balls. A golf ball sensor system 490 is an example of the golf ball sensor system 140, 150 from FIG. 1, and includes both a computer (e.g., data processing apparatus 250) and a sensor (e.g., stereo camera 254 integrated with a data processing apparatus 250). The system 490 detects a golf ball 460, in flight, after it has been hit from one of the four tee areas 450. From this initial observation of the golf ball 460 and one or more subsequent observations of the golf ball 460, the system 490 determines a three dimensional trajectory 464 (note that the figure only represents two dimensions for clarity of illustration). The three dimensional trajectory 464 is then extrapolated backward in time to generate an extrapolated trajectory 462, which intersects both tee area 450A in golf bay 440A and tee area 450B in golf bay 440B. Thus, from the initial observations, it is not readily discernible which golf bay 440A, 440B and which tee area 450A, 450B should be identified as the originating physical location of the golf shot.

Thus, the system 490 needs to determine which of the tee areas 450A, 450B to consider as a potential originating tee area. In some implementations, the system 490 produces one or more error measures for each tee area 450A, 450B and compares them. In some implementations, error measures for adjacent tee areas 450A, 450B (or golf bays) will have very similar values, so such a comparison may not be useful even though the error measure for either of these adjacent tee areas 450A, 450B (or golf bays) is very useful for deciding when it is time to confirm a golf shot origination. Thus, in some implementations, the system 490 selects only one of the tee areas 450A, 450B based on one or more calculated distance measures and produces one or more error measures for only the selected tee area in relation to the current extrapolated trajectory 462. For example, the system 490 can decide which tee area 450A, 450B to consider as a potential origination for the golf shot based on the distances between intersection points of the extrapolated trajectory 462 with the geometric shapes representing the tee areas 450A, 450B, and predefined points within the tee areas 450A, 450B. Detailed examples are provided below, but as noted above, various distance measures can be used in various combinations.

In some implementations, the system 490 compares the distances DA, DB between (1) the intersection points of the extrapolated trajectory 462 with the tee areas 450A, 450B, and (2) the mid-points or center points of the tee areas 450A, 450B. The system 490 can also use as a distance measure the last golf bay and or tee area the extrapolated trajectory 462 intersects as it moves forward, as it can be presumed that golfers don't hit golf balls through each other's golf bays or tee areas. Thus, in the example of the intersection points shown in FIG. 4B, the tee area 450B can be indicated as the originating tee area.

Moreover, the system 490 can use other predefined (or defined on the fly) positions within a golf bay or a tee area from which to measure distances. For example, the system 490 can compare the distances between (1) the intersection points of the extrapolated trajectory 462 with the tee areas 450A, 450B, and (2) respective hitting positions HA, HB within the tee areas 450A, 450B. These hitting positions HA, HB can be predefined in the system based on information regarding the typical stances taken by players when golfing, or by details of the tee areas, such as the tee location in a tee-up system. These hitting positions HA, HB can also be determined based on input to the system. For example, if the current golfer assigned to a tee area is known to be left handed, the hitting position can be adjusting accordingly, or if camera imagery from a tee area indicates a position where the ball is placed before a golf shot, the hitting position for that tee area can be updated on the fly based on the camera imagery.

In some implementations, the system 490 checks whether the extrapolated trajectory 462 is within a predefined distance of the hitting positions HA, HB for the tee areas 450A, 450B. If so, the golf shot is considered to have hit that tee. If an extrapolated trajectory only hits one tee, this tee can be selected by the system 490 for determining an error measure and potential identification as the originating tee. If the extrapolated trajectory hits more than one tee based on the predefined distance, the system 490 can select the last tee area intersected, e.g., tee 450B in the example of FIG. 4B. If the extrapolated trajectory hits no tees based on the predefined distance, the system 490 can likewise select the last tee area intersected. Note that this process can apply to golf bays as well, such as when each golf bay has (or is) only one tee area.

In addition, the tee area and/or golf bay selection is used to identify a display device on which to show information regarding the golf shot, e.g., golf shot statistics and/or golf shot rendering or animation in a virtual golf game, which can include a representation of a golf course or other virtual game features. For example, if the tee area 450A is selected as the source of the golf shot, and the error measure provides a sufficient degree of certainty, the golf shot information is shown on display device 470, which is associated with golf bay 440A or with tee area 450A. As another example, if the tee area 450B is selected as the source of the golf shot, and the error measure provides a sufficient degree of certainty, the golf shot information can be shown on display device 475, which is associated with the golf bay 440B or with the tee area 450B, or with a person associated with the golf bay 440B or with the tee area 450B.

Figure 5A:
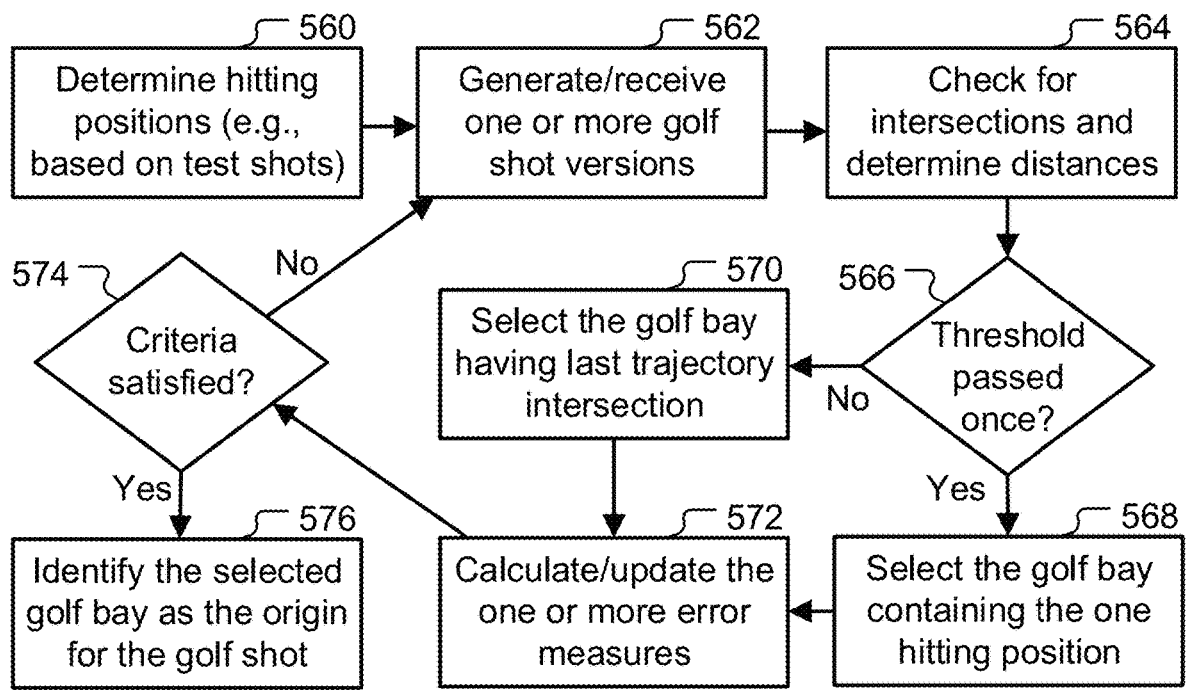
FIG. 5A is a flowchart showing another example of a process of locating an originating physical location of a golf ball detected and tracked in flight.

Moreover, as explained above, multiple versions of each golf shot can be produced, by the same golf ball sensor system 490 and/or by other golf ball sensor system(s) observing golf balls hit from the same golf bays 440A, 440B. FIG. 5A is a flowchart showing another example of a process of locating an originating physical location of a golf ball detected and tracked in flight. Hitting positions can be determined 560 (e.g., by computer(s) 150, 200, 250, 420, 490, 500, 660) within geometric shapes representing the defined physical locations (e.g., for golf bays, tee areas, or other physical locations). These hitting positions can be predefined for the system or determined dynamically, and the geometric shapes can be three dimensional shapes.

Figure 5B:
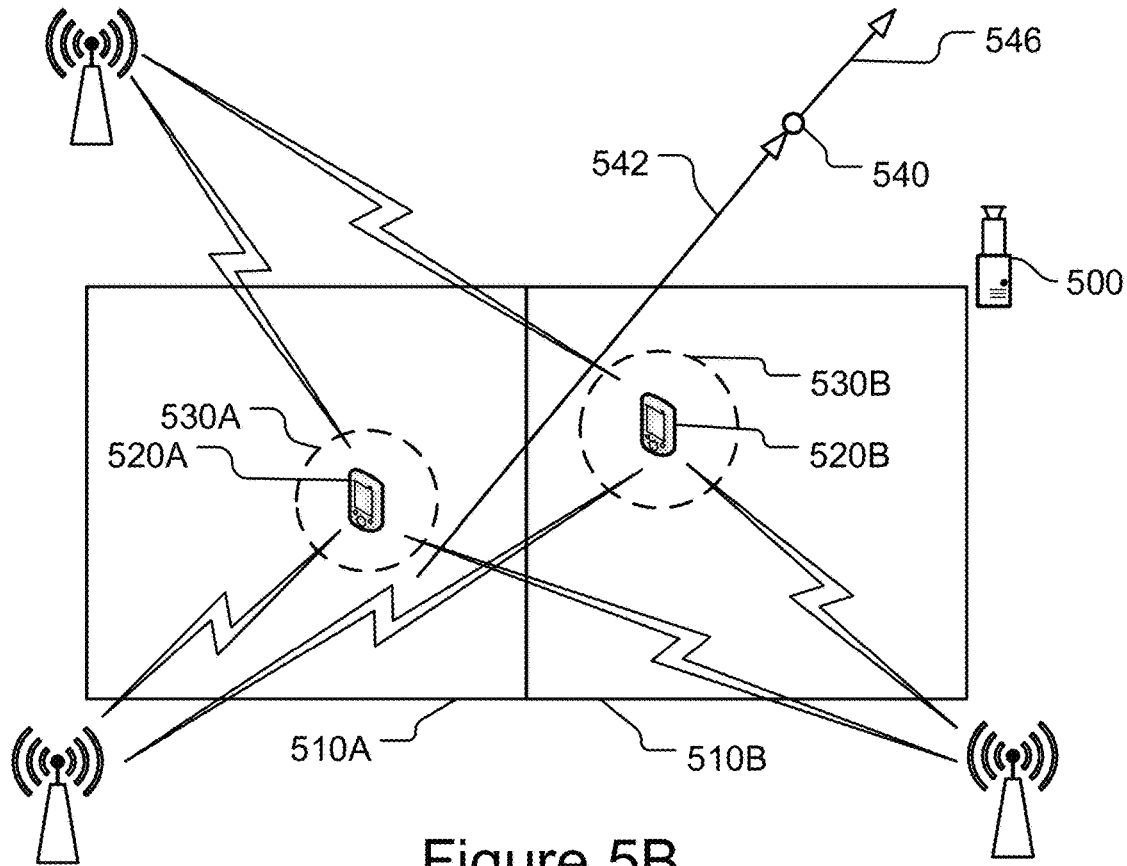
FIG. 5B shows an example of a system that performs in flight 3D tracking of a golf ball in relation to personal mobile devices for the golfers.

As noted above, the input to the system used to dynamically determine the hitting positions can be information about the current golfer or camera imagery of the tee area. Further, in some implementations, the input to the system used to dynamically determine the hitting positions can be input from an electronic location system including a mobile device associated with the golfer and a communication system, such as a global navigation satellite system (GNSS), e.g., the Global Positioning System (GPS), a mobile phone network, or other wireless network, e.g., a WiFi network. FIG. 5B shows an example of a system that performs in flight 3D tracking of a golf ball in relation to personal mobile devices for the golfers.

The example of FIG. 5B is similar to the example of FIG. 4B, in that it can be used in the system of FIG. 4A, and a golf ball sensor system 500 is similar to the golf ball sensor system 490 described above. Regions 510A, 510B can be golf bays or tee areas, or simply presumed areas for the golfers, e.g., designated regions along a tee line. In any case, the regions 510A, 510B can be referred to generically as golf bays 510A, 510B and can have geometric shapes representing them such that intersections of an extrapolated trajectory with these geometric shapes can be readily identified.

The system 500 detects a golf ball 540, in flight, after it has been hit from one of the golf bays 510A, 510B. From this initial observation of the golf ball 540 and one or more subsequent observations of the golf ball 540, the system 500 determines a three dimensional trajectory 546 (note that the figure only represents two dimensions for clarity of illustration). The three dimensional trajectory 546 is then extrapolated backward in time to generate an extrapolated trajectory 542, which intersects both golf bay 510A and golf bay 510B. Thus, the system 500 needs to determine which of the regions 510A, 510B to consider as a potential originating region.

To assist in this determination, signals from mobile devices 520A, 520B, which are associated with golfers in respective golf bays/regions 510A, 510B, can be obtained to determine the hitting positions 530A, 530B associated with the golfers. For example, mobile devices 520A, 520B can be GPS devices, or smart phones or tablet computers that communicate in a wireless network that allows triangulation or other device location services, as shown in FIG. 5B. In some implementations, the hitting positions 530A, 530B are set for each golfer based on sensor data obtained by the system 500 for one or more test shots by each golfer, and the location data from the respective mobile devices 520A, 520B associated with the golfers. These hitting positions 530A, 530B can then be used as described above, or as described in further detail below in connection with FIG. 5A. Note that the mobile devices 520A, 520B can also be the display devices to which the golf shot information is sent once the origin for a golf shot is confirmed.

Referring again to FIG. 5A, one or more golf shot versions are generated or received 562 (e.g., by computer(s) 150, 200, 250, 420, 490, 500, 660). For example, in some implementations, each of sensors 410A, 410B in FIG. 4A has dedicating computer hardware that processes sensor data using a physics model for golf ball flight, extrapolates the part of the trajectory that is outside its field of view (or is missed by the sensor for other reasons), and performs the error measure assessment, thus forming discrete sensor systems 410A, 410B, which can report their results to a central computer system 420 that takes the results from these discrete sensor systems 410A, 410B and makes a final determination regarding which golf bay 430 to identify as the origin of a particular golf shot. Thus, the central computer 420 can receive different versions of a golf shot from respective golf ball sensor systems 410A, 410B, as well as more than one version of the golf shot from a same golf ball sensor system 410A, 410B.

In some implementations, as soon as a golf ball sensor system in the larger system starts to track a golf ball, it produces versions of that golf shot at regular intervals. The first version will contain the first part of the trajectory, the second version contains all the observations from the first version plus additional newer observations. In some implementations, the later versions inherit the golf bay that was assigned to the first version. In some implementations, the assigned golf bay is determined again for each new version of the golf shot. In any case, the versioning process can reduce the latency until the system can start showing the trajectory to the golfer.

Intersections between the extrapolated trajectory and geometric shapes representing the two or more defined physical locations (e.g., intersections of the extrapolated trajectory 542 and regions 510A, 510B) are identified 564 (e.g., by computer(s) 150, 200, 250, 410, 490, 500) and distances between the extrapolated trajectory and the hitting positions within the respective geometric shapes (e.g., hitting positions 530A, 530B) are determined 564 (e.g., by computer(s) 150, 200, 250, 410, 490, 500). In some implementations, such as shown in FIG. 5B, intersections will generally be found, except in some cases for extrapolated trajectories around the two ends of the full set of golf bays. Thus, the distance calculation can be between the point of the intersection and the defined hitting position. In situations where there is no intersection of an extrapolated trajectory with a given golf bay, the distance calculation can be the length of a line that intersects the hitting position and is normal to the extrapolated trajectory.

The calculated distances to the hitting positions can be compared 566 to a threshold, which can be set experimentally for a given implementation, e.g., 40 centimeters. If only one of these calculated distances to the hitting positions passes the threshold (i.e., is less than the threshold), then the golf bay containing that hitting position is selected 568 (e.g., by computer(s) 150, 200, 250, 410, 490, 500) for estimating the systemic and stochastic error. If both of these calculated distances to the hitting positions pass the threshold, or if neither of these calculated distances to the hitting positions pass the threshold, then the last intersected golf bay along the extrapolated trajectory (in the direction of the initial observations of the golf ball) is selected 570 (e.g., by computer(s) 150, 200, 250, 410, 490, 500) for estimating the systemic and stochastic error.

Then, the one or more error measures are calculated/updated 572 (e.g., by computer(s) 150, 200, 250, 410, 490, 500). This can involve the operations 316, 318, 320 as describe above in connection with FIG. 3A. A check is made 574 (e.g., by computer(s) 150, 200, 250, 420, 490, 500, 660) as to whether the one or more error measures satisfy a predefined criteria. This can involve the operations described above for check 322 in connection with FIG. 3A. Thus, when the one or more error measures do not satisfy 574 the predefined criteria, the process can wait for additional observations of the golf ball by the one or more golf ball sensors, and thus wait for a next set of one or more versions of the golf shot to be generated 562 (e.g., by computer(s) 150, 200, 250, 410, 490, 500) and received 562 (e.g., by computer(s) 150, 250, 420).

For example, the central computer 420 can receive different versions of a golf shot from respective golf ball sensor systems 410A, 410B, which have different perspectives of the same golf shot. Each received version of a golf shot can include both the extrapolated trajectory and the confidence measure (one or more error measures) of the originating golf bay for the golf shot. Thus, each respective golf ball sensor system 410A, 410B can perform its own independent calculation of all the parameters for each golf ball shot trace it finds, and pass the results of that independent calculation to the central computer 420. The central computer 420 can compare the trajectory data to determine if the two golf ball sensor systems 410A, 410B are observing the same golf ball in flight, and the central computer 420 can then use the best set of trajectory data from the two sensor systems 410A, 410B in accordance with the received confidence measures provided by the two sensor systems 410A, 410B.

This process can then repeat, and as noted above, the criteria can change from one check 574 to a next. Further, when the one or more error measures do satisfy 574 the predefined criteria, the selected golf bay is identified 576 (e.g., by computer(s) 150, 200, 250, 420, 490, 500, 660) as the origin for the golf shot. The identified origin is then used as input for further processing (e.g., by computer(s) 150, 200, 250, 420, 490, 500, 660) such as by using the identified origin to facilitate further tracking of the golf ball in flight and/or presenting golf shot information on a display device associated with the identified originating location, as described in detail above.

In addition, as noted above, the defined physical locations can be tee positions generally, the golf ball sensor system can be set up in a sports stadium or arena, or on an open field, and so the defined physical locations can be spots along a tee line chosen by individual golfers. In such implementations, there may be no specifically designated areas or regions for the individual golfers, and the golfers can choose locations that are very close to each other. In such cases, it may not be reasonable to presumed that golfers do not hit golf balls through each other's "tee areas" from the perspective of the golf ball sensor system, and so there are situations in which it is preferable to form the one or more error measures (from the estimated systemic error and the estimated stochastic error) for each of two different physical locations.

Figure 6A:
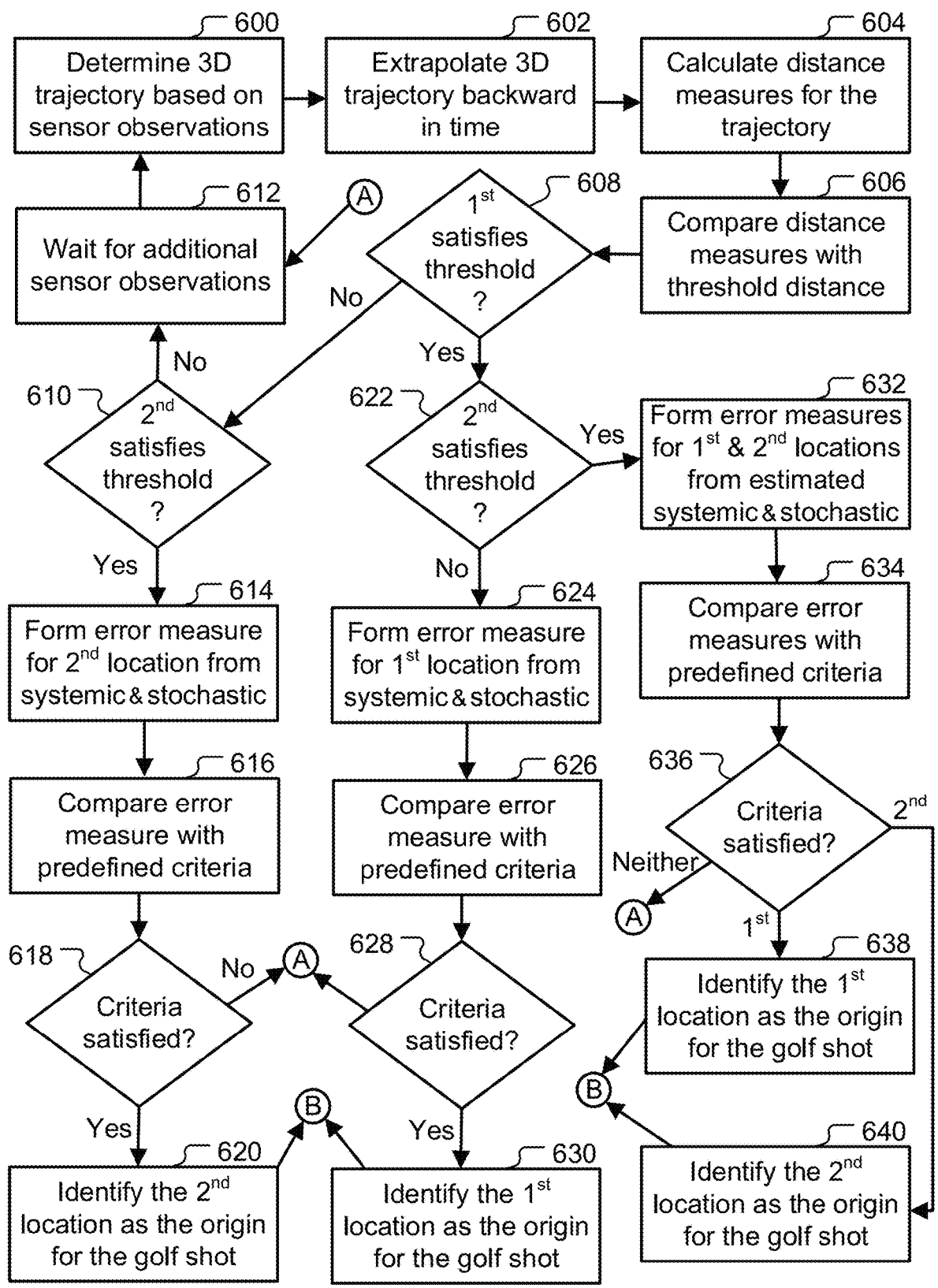
FIGS. 6A & 6B are a flowchart showing another example of a process of locating an originating physical location of a golf ball detected and tracked in flight.
Figure 6B:
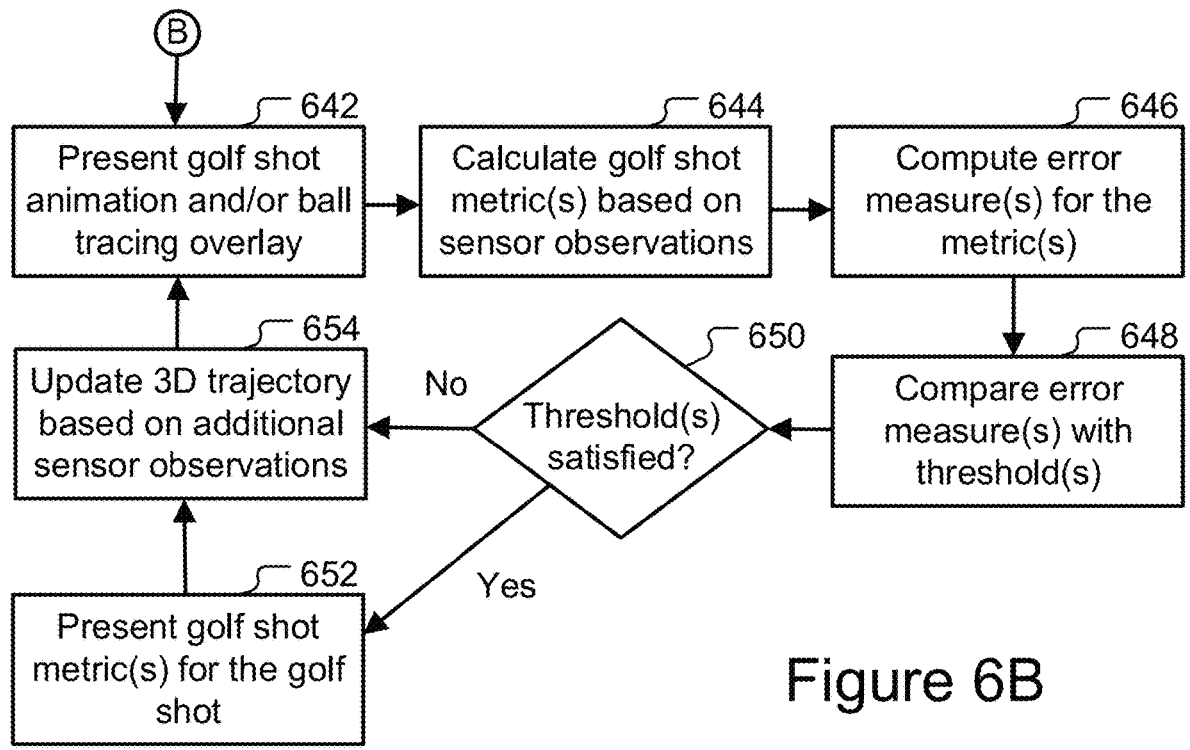

FIGS. 6A & 6B are a flowchart showing another example of a process of locating an originating physical location of a golf ball detected and tracked in flight. When a new golf shot is detected, a three dimensional trajectory for the golf ball in the three dimensional physical space is determined 600 (e.g., by computer(s) 150, 200, 250, 420, 490, 500, 660) based on the initial observations of the golf ball that have been identified, and the three dimensional trajectory of the golf ball is extrapolated 602 (e.g., by computer(s) 150, 200, 250, 420, 490, 500, 660) backward (and potentially forward) in time to generate an extrapolated trajectory. This can involve performing physical modelling and extrapolation of the trajectory as described above, e.g., in connection with FIG. 3A.

Distance measures between the extrapolated trajectory and the two or more defined physical locations are calculated 604 (e.g., by computer(s) 150, 200, 250, 420, 490, 500, 660). This can involve finding an intersection between the extrapolated trajectory and geometric shapes that represent the two or more defined physical locations and/or determining distances to estimated hitting positions (e.g., center points) within those geometric shapes as described above, e.g., in connection with FIG. 3A. In some implementations, the distance measures are compared 606 (e.g., by computer(s) 150, 200, 250, 420, 490, 500, 660) with one or more threshold distances, and the process decision flow changes based on checks 608, 610, 622 as to whether (1) neither of first and second distance measures satisfies the one or more threshold distances, (2) only the first or only the second distance measure satisfies the one or more threshold distances, or (3) both of the first and second distance measures satisfy the one or more threshold distances.

Figure 6C:
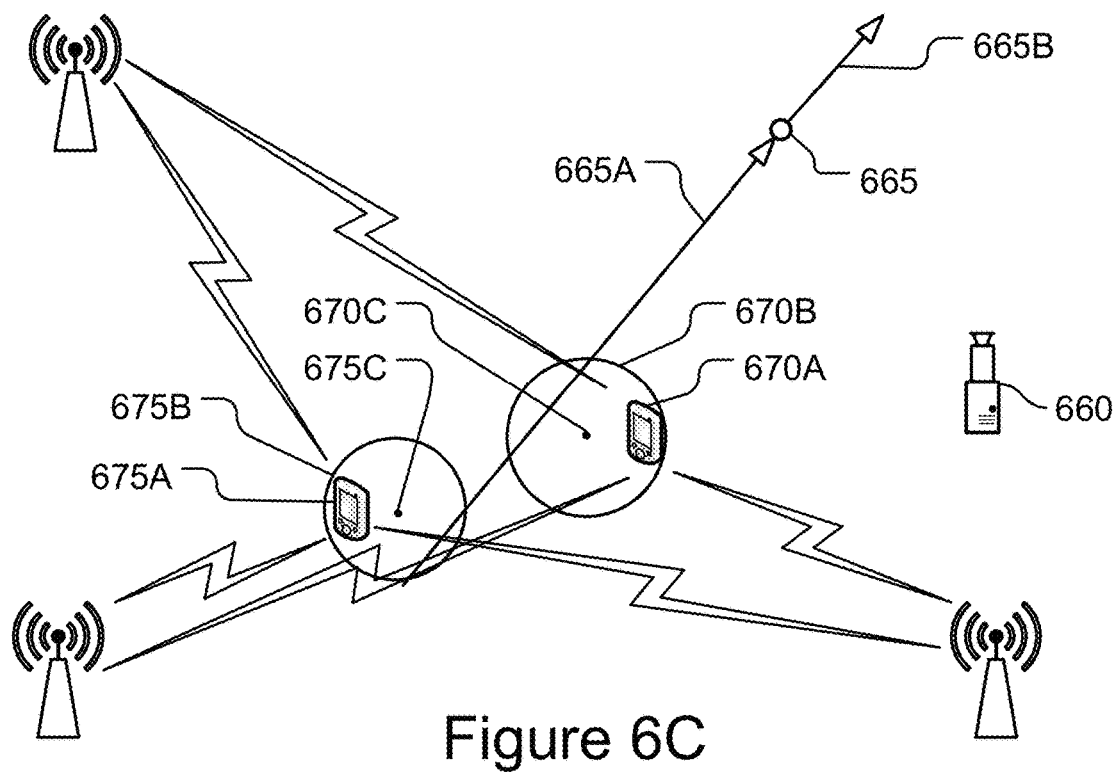
FIG. 6C shows another example of a system that performs in flight 3D tracking of a golf ball in relation to personal mobile devices for the golfers.

In addition, in some implementations, the process operations 604, 606, 608, 610, 622 that determine which physical locations are potentially the origin for a golf shot involve checking for intersections between the extrapolated trajectory and geometric shapes (e.g., squares, rectangles, annular sectors, circles, cubes, boxes, cuboids, 3D annular sectors, cylinders, spheres, etc.) that represent the two or more defined physical locations. FIG. 6C shows another example of a system that performs in flight 3D tracking of a golf ball in relation to personal mobile devices for the golfers.

The example of FIG. 6C is similar to the example of FIG. 5B, in that it can be used in the system of FIG. 4A, and a golf ball sensor system 660 is similar to the golf ball sensor system 490 described above. However, in this case, there are no presumed areas for the golfers. Rather, the two or more physical locations from which golf balls are hit into the three dimensional physical space are defined by determining (e.g., by computer(s) 150, 200, 250, 420, 490, 500, 660) hitting positions 670C, 675C for the golfers, e.g., along a grass tee line. To assist in this determination, signals from mobile devices 670A, 675A, which are associated with golfers, can be obtained to determine the hitting positions 670C, 675C associated with the golfers. For example, mobile devices 670A, 675A can be GPS devices, or smart phones or tablet computers that communicate in a wireless network that allows triangulation or other device location services, as shown in FIG. 6C, e.g., triangulation using WiFi and/or Bluetooth beacons installed at the driving range to triangulate the position of the user device.

In some implementations, the position of each mobile device 670A, 675A is located (e.g., by computer(s) 150, 200, 250, 420, 490, 500, 660) using data from the electronic location system, e.g., using WiFi and/or Bluetooth technology, and the hitting positions 670C, 675C are then set (e.g., by computer(s) 150, 200, 250, 420, 490, 500, 660) based on the positions of the mobile devices 670A, 675A. Note that each hitting position 670C, 675C can be offset from the position of each respective mobile device 670A, 675A by some amount based on other information. For example, determining the hitting positions 670C, 675C for the golfers can involve offsetting the position of the mobile device in a first direction responsive to the given golfer being right handed, e.g., hitting position 675C is offset to the right (with respect to the hitting direction for the golfers) from the position of mobile device 675A since it is known that this mobile device is associated with a right handed golfer, and offsetting the position of the mobile device in a second direction, which is opposite the first direction, responsive to the given golfer being left handed, e.g., hitting position 670C is offset to the left (with respect to the hitting direction for the golfers) from the position of mobile device 670A since it is known that this mobile device is associated with a left handed golfer.

Other systems and techniques can also be used to determine the hitting positions 670C, 675C associated with the golfers. In some implementations, the hitting positions 670C, 675C are determined for each golfer based on sensor data obtained by the system 660 for one or more test shots by each golfer, and optionally using the location data from the respective mobile devices 670A, 675A associated with the golfers. As before, mote that the mobile devices 670A, 675A can also be the display devices to which the golf shot information is sent once the origin for a golf shot is confirmed, and these mobile devices 670A, 675A can also be used in the test shot process to determine the hitting positions 670C, 675C.

For example, in some implementations, a golfer hits one or more shots fulfilling a criteria, such as having a launch angle higher than NN degrees, e.g., greater than 18 degrees. All shots hit from the same grass tee can be displayed to the user in a top-down 3D-view of the grass tee and range. The user selects their shot(s) in this view. The client application determines the launch position of these shots, and sends this position back to the server, requesting any new shots matching this position, and the server stores this position temporarily in memory. Any new shots originating from the grass tee can then be checked for intersection with a sphere (or similar geometric shape) centered around the positions stored in memory, and the golf shot can be sent to any clients with a matching position (i.e., where the trajectory intersects or is close enough to the geometric shape around the position), if it fulfills the following criteria: the systemic and stochastic errors are small enough, where these errors are determined as in this disclosure, with the hitting position used as the "bay position" in the equations.

In some implementations, the geometric shapes 670B, 675B are only stored in temporary memory (e.g., on a client-side device in a golf ball tracking system) because they will change with the hitting positions 670C, 675C, which are dependent on where each golfer happens to decide to stand when hitting a golf ball. Further, the determination of the hitting positions 670C, 675C can be done once using one or more test shots, such as described above, and/or be done in an ongoing manner by tracking the movement of each golfer's mobile device and/or using each new golf shot from a golfer to update the hitting position for that golfer. In any case, once the hitting positions 670C, 675C are determined, the locations of the geometric shapes 670B, 675B are specified (e.g., by computer(s) 150, 200, 250, 420, 490, 500, 660) using the determined hitting positions 670C, 675C, e.g., each geometric shape can be a circle, cylinder or sphere with the hitting position at its center. With the locations of these geometric shapes 670B, 675B specified, identifying which of those geometric shapes 670B, 675B are intersected by an extrapolated trajectory is straight forward.

The system 660 detects a golf ball 665, in flight, after it has been hit. From this initial observation of the golf ball 665 and one or more subsequent observations of the golf ball 665, the system 660 determines a three dimensional trajectory 665B (note that the figure only represents two dimensions for clarity of illustration). The three dimensional trajectory 665B is then extrapolated backward in time to generate an extrapolated trajectory 665A. In the example shown, the extrapolated trajectory 665B intersects both geometric shapes 670B, 675B. But this need not be the case. In some situations, only one of the geometric shapes 670B, 675B will be intersected by the extrapolated trajectory 665B. In some situations, none of the geometric shapes 670B, 675B will be intersected by the extrapolated trajectory 665B, and further ball observations will be needed to determine which of the hitting positions 670C, 675C is the originating location for the golf shot.

Returning to FIG. 6A, in some implementations, the finding of an intersection between an extrapolated trajectory and one or more geometric shape (e.g., a sphere in three dimensions or a circle in two dimensions) around one or more hitting positions constitutes the process operations 604, 606, 608, 610, 622 since the size of the geometric shape can be set in accordance with the threshold (e.g., the radius equals the threshold value). In some implementations, the process operations 604, 606, 608, 610, 622 involve calculating and checking one or more distance measures more generally, e.g., checking for an intersection first and then checking a different distance measure, as described in this disclosure, such as checking the distance between the intersection point and the estimated hitting position.

In response to determining that neither the first nor the second distance measure(s) satisfies one or more thresholds, the process waits 612 for additional observations of the golf ball by the one or more golf ball sensors. Thus, the process returns to update 600 the three dimensional trajectory for the golf ball in the three dimensional physical space based on new observations of the golf shot. As more ball observations are made, the trajectory is updated and the extrapolated trajectory becomes more accurate, until the distance measure(s) are satisfied for at least one of the defined physical locations, e.g., locations 670B, 675B.

In response to determining that the first distance measure(s) do not satisfy the one or more thresholds, but the second distance measure(s) does, an error measure for a second of the defined physical locations is formed 614 (e.g., by computer(s) 150, 200, 250, 420, 490, 500, 660) from an estimated systemic error for at least one of the initial observations of the golf ball and an estimated stochastic error associated with the at least one of the initial observations of the golf ball, where the systemic and stochastic errors are computed as described above. And as before, the one or more error measures for the second of the defined physical locations are compared 616 (e.g., by computer(s) 150, 200, 250, 420, 490, 500, 660) with predefined criteria, and when the one or more error measures do not satisfy 618 the predefined criteria, the process waits 612 for additional observations of the golf ball by the one or more golf ball sensors, and the process returns to update 600 the three dimensional trajectory for the golf ball in the three dimensional physical space based on new observations of the golf shot. Moreover, when the one or more error measures do satisfy 618 the predefined criteria, the process identifies the second of the defined physical locations as the origin for the golf shot.

In response to determining that the first distance measure(s) do satisfy the one or more thresholds, but the second distance measure(s) do not, an error measure for a first of the defined physical locations is formed 624 (e.g., by computer(s) 150, 200, 250, 420, 490, 500, 660) from the estimated systemic error for the at least one of the initial observations of the golf ball and the estimated stochastic error associated with the at least one of the initial observations of the golf ball, where the systemic and stochastic errors are computed as described above. And as before, the one or more error measures for the first of the defined physical locations are compared 626 (e.g., by computer(s) 150, 200, 250, 420, 490, 500, 660) with predefined criteria, and when the one or more error measures do not satisfy 628 the predefined criteria, the process waits 612 for additional observations of the golf ball by the one or more golf ball sensors, and the process returns to update 600 the three dimensional trajectory for the golf ball in the three dimensional physical space based on new observations of the golf shot. Moreover, when the one or more error measures do satisfy 628 the predefined criteria, the process identifies 630 the first of the defined physical locations as the origin for the golf shot.

In response to determining that both the first distance measure(s) and the second distance measure(s) satisfy the one or more thresholds, error measures are formed 632 (e.g., by computer(s) 150, 200, 250, 420, 490, 500, 660) for each of the first and second defined physical locations from the estimated systemic error for the at least one of the initial observations of the golf ball and the estimated stochastic error associated with the at least one of the initial observations of the golf ball, where the systemic and stochastic errors are computed as described above. Further, the one or more error measures for each the first and second defined physical locations are compared 634 (e.g., by computer(s) 150, 200, 250, 420, 490, 500, 660) with predefined criteria. When the one or more error measures for neither of the first and second defined physical locations satisfy 636 the predefined criteria, the process waits 612 for additional observations of the golf ball by the one or more golf ball sensors, and the process returns to update 600 the three dimensional trajectory for the golf ball in the three dimensional physical space based on new observations of the golf shot. When the one or more error measures for the first defined physical location satisfies 636 the predefined criteria, the process identifies 638 the first of the defined physical locations as the origin for the golf shot. When the one or more error measures for the second defined physical location satisfies 636 the predefined criteria, the process identifies 640 the second of the defined physical locations as the origin for the golf shot.

In some implementations, the error measure(s) are calculated in such a way that it is not possible for both of the first and second locations to satisfy the predefined criteria at once. For example, the check 636 can involve comparing the error measure(s) for the first and second locations with each other, so only the location with the best error measure(s) is selected as the origin. Thus, the predetermined criteria that is checked 618, 628, 636 can be a single criteria, e.g., a single error threshold, or two or more criteria, as described above.

In any case, once an originating location for a golf shot has been determined, the process presents (e.g., by computer(s) 150, 200, 250, 420, 490, 500, 660) golf ball tracking data on a display device associated with the defined physical location identified as the origin for the golf ball, e.g., on the display device of one of mobile devices 670A, 675A. Referring to FIG. 6B, the process initially presents 642 golf ball tracking data representing the currently determined trajectory of the golf shot. This can include presenting a golf shot animation or a ball tracing overlay (on live video of the golf shot) for the golf ball in flight. After this initial presentation of the golf shot's trajectory, which can be updated in real time as new ball observations are made, the presentation of golf ball tracking data on the display device can involve selective presentation of one or more metrics for the golf ball in flight in the three dimensional physical space based on the estimated systemic error, the estimated stochastic error, or both the estimated systemic error and the estimated stochastic error.

One or more golf shot metrics (e.g., ball speed, ball spin, launch angle, etc.) are calculated 644 (e.g., by computer(s) 150, 200, 250, 420, 490, 500, 660) based on the sensor observations. One or more error measures for the one or more golf shot metrics are computed 646 (e.g., by computer(s) 150, 200, 250, 420, 490, 500, 660) using the estimated systemic and/or stochastic errors, and these error measure(s) for the metrics are compared 648 (e.g., by computer(s) 150, 200, 250, 420, 490, 500, 660) with one or more thresholds to determine 650 if those threshold(s) are satisfied. For each metric that has its error measure(s) satisfied, that metric is presented 652 on the display device, before the process updates 654 the three dimensional trajectory based on additional sensor observations and updates 642 the trajectory data being shown to the user of the display device. Thus, one or more different golf shot metrics are shown to the user at different times in relation to each other and in relation to the shown animation and/or tracing overlay, depending on different error measures that incorporate the systemic and stochastic error calculations for the ball trajectory determined from the observations of the ball in flight.

In other words, in the case of using error estimates to display metrics, the golf shot itself can be initially displayed to the user while waiting to display one or more of the metrics, since they will use somewhat different error measures and different thresholds. For example, the pre-determined threshold for the stochastic errors can be different for each metric, such that it matches the difficulty of determining the correct value for the metric based on the available data.

Further, depending on the metric, either one of the systemic and stochastic errors, or both of them, can be used. For example, if the metric is calculated as the difference between multiple observed points (such as for ball speed) the stochastic error can be used since the metric of interest compares subsequent trajectory points, and thus systemic errors for subsequent points will cancel each other out; because the systemic error would be the same for adjacent points, when subtracting the two numbers from each other, they would cancel out. For example, if the system has a systemic error that places all observations one inch to the right of their true position, the speed would not be affected by this. But if the metric depends on the absolute position of the ball, then the systemic error can be taken into account as well.

Figure 7:
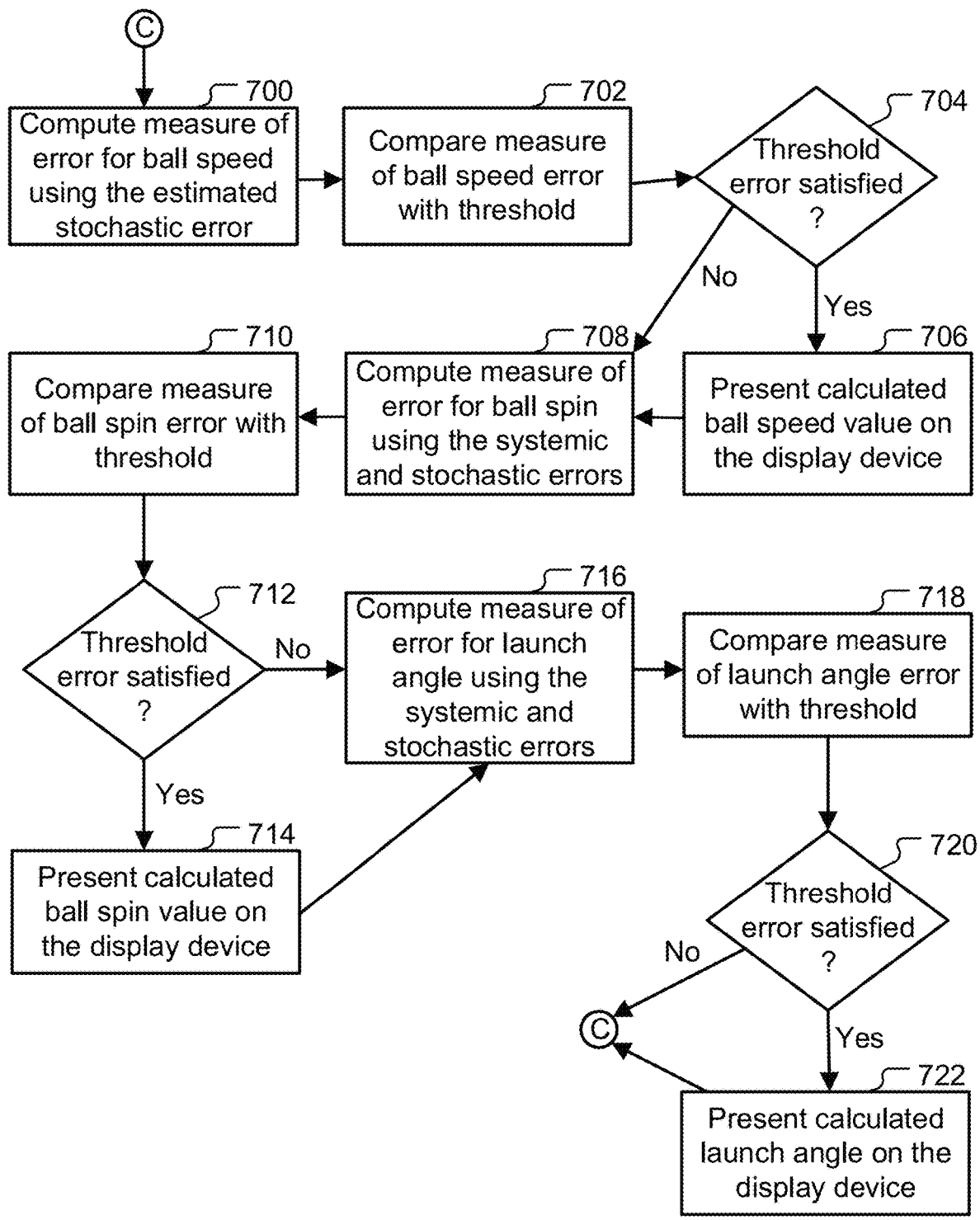
FIG. 7 is a flowchart showing an example of a process of selectively presenting metrics for a golf shot.

FIG. 7 is a flowchart showing an example of a process of selectively presenting metrics for a golf shot (e.g., performed by computer(s) 150, 200, 250, 420, 490, 500, 660). A measure of error for ball speed is computed 700 using the estimated stochastic error. In some implementations, this involves using a component of an error vector for the ball speed that lies in a hitting direction for the three dimensional physical space. The measure of error for ball speed is compared 702 with a threshold, and in response to the threshold being satisfied 704, a ball speed value calculated for the three dimensional trajectory for the golf ball is presented 706 on the display device.

In some implementations, the actual error of the speed, e_spd, in the first observation (e.g., based on the stochastic error for the first observation) is propagated back to the physical location with the extrapolation distance: e_spd_location=e_spd*∥p0−a∥. Note that the systemic and stochastic error in the first observation is the error of the position of the ball at that point. Similarly, the error of the ball speed for the first observation can be determined by using the regular equations for how to calculate the ball speed for the first observation twice, once where the systemic and the stochastic error is zero, and once when it's at the estimated value for the points involved in the calculation, and then compare the difference in the ball speed.

When doing this, one sees that the systemic error wouldn't affect the error of the ball speed since the systemic error is the same for two adjacent points (and thus cancel out when subtracting the position of two adjacent points to get the ball speed) while the stochastic error does not, since it cannot be assumed that they work in the same direction for two adjacent points. The ball speed is the norm of the difference between the first two observations, $p_1$ and $p_0$, divided by the time difference between these points:

$$v = \left\| \frac{p_1 - p_0}{t_1 - t_0} \right\|$$

Now, consider that $p_1$ has a stochastic error $e_1^{sto}$ and a systemic error $e_1^{sys}$, and $p_0$ has a stochastic error $e_0^{sto}$ and a systemic error $e_0^{sys}$. The equation, including the errors would become:

$$\tilde{v} = \left\| \frac{(p_1 + e_1^{sto} + e_1^{sys}) - (p_0 + e_0^{sto} + e_0^{sys})}{t_1 - t_0} \right\|$$

But since the systemic error is assumed to be the same for adjacent points, i.e. $e_1^{sys} = e_0^{sys}$, those terms cancel out, and the speed becomes:

$$\tilde{v} = \left\| \frac{(p_1 + e_1^{sto}) - (p_0 + e_0^{sto})}{t_1 - t_0} \right\|$$

The error in ball speed would thus be the absolute difference between $v$ and $\tilde{v}$: $|\tilde{v} - v|$.

A measure of error for the ball spin vector is computed 708 using the estimated systemic error and the estimated stochastic error. The measure of error for ball spin is compared 710 with a threshold, and in response to the threshold being satisfied 712, a ball spin value calculated for the three dimensional trajectory for the golf ball is presented 714 on the display device.

In some implementations, the spin vector error at the first observation, e_spin, is relatively constant when extrapolated, except for a small spin decay factor, which in this case will increase the spin, since the trajectory extrapolation is backwards. Further, a method similar to that described above for ball speed can be used for ball spin, i.e., calculating the spin number assuming no error in the positions, and then comparing the result to the number one gets when including the errors. In general, let x be a time series of observations of the golf ball, and $\omega = f(x)$ be a function that estimates the spin vector for all observations of the ball, one vector for each time step in x. Then let a function g apply stochastic noise and a function h apply systemic noise to the time series x, so that each step $x_i$ can be expressed as: $x_i = p_i + e_i^{sto} + e_i^{sys}$. The difference between $\omega$ and $\tilde{\omega} = h(g(x))$ can then be calculated, and $|\omega_0 - \tilde{\omega}_1|$ can be used as an estimate for the error of the spin vector in the first observation. To get the error of the spin vector for the launch of the shot, this number can be multiplied by the spin decay factor mentioned above, together with the extrapolation distance.

A measure of error for launch angle is computed 716 using the estimated systemic error and the estimated stochastic error. The measure of error for launch angle is compared 718 with a threshold, and in response to the threshold being satisfied 720, a launch angle calculated for the three dimensional trajectory for the golf ball is presented 722 on the display device. In some implementations, a first component of an error vector for the launch angle that lies in the hitting direction for the three dimensional physical space is checked against a first threshold, and a second component of the error vector for the launch angle that lies in a vertical axis, which is perpendicular to the hitting direction, is checked against a second threshold. In some implementations, only the angle between the launch direction of the shot and the ground is checked against a single threshold.

In some implementations, the actual launch angle error at the first observation, e_la, can be assumed to not grow with extrapolation in the same way as e_spd since e_la is already an angular error. As noted above, the systemic and stochastic error in the first observation is the error of the position of the ball at that point. Similarly, the error of the launch angle can be determined by using the regular equations for how to calculate the launch angle twice, once where the systemic and the stochastic error is zero, and once when it's at the estimated value, and then compare the difference in the launch angle. The launch angle can generally be computed as:

$$\tan^{-1} \frac{-(p_1^y - p_0^y)}{\sqrt{(p_1^x - p_0^x)^2 + (p_1^z - p_0^z)^2}}$$

where $p_i^y$, is the y-component of the $i^{th}$ observation of the trajectory. Just as with the ball speed, the launch angle can be computed twice, once without any estimated stochastic and systemic errors, and once with, and the difference between these values can be the estimate of the launch angle error.

Note that this error does not grow with the extrapolation distance because of the assumption that the extrapolation method itself will continue the extrapolation in roughly the same direction as the last (or first when extrapolating backwards) points indicate. So if there is an error in the angle there, the error in the position when extrapolating grows, but the error in the angle itself will stay the same.

Figure 8A:
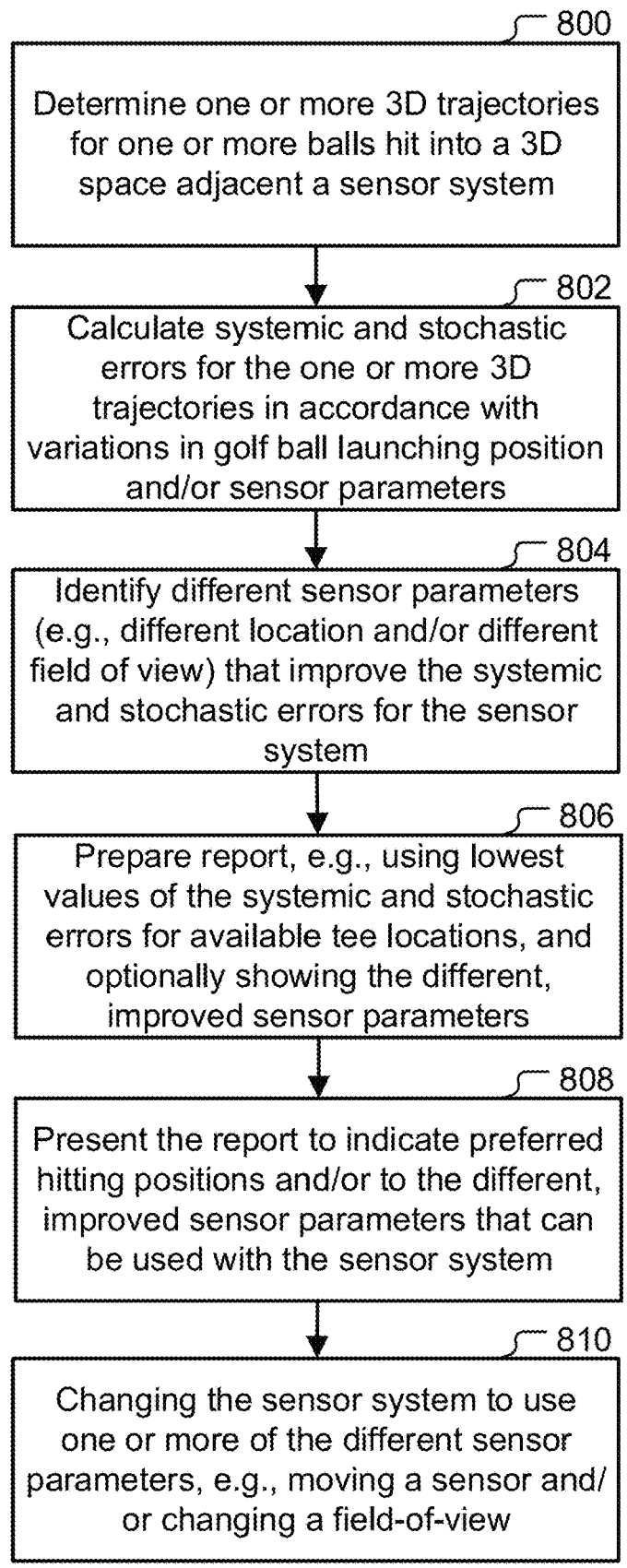
FIG. 8A is a flowchart showing an example of a process of determining the effective coverage of one or more sensors in an object tracking system.

In addition, regardless of whether or not shot metrics are selectively presented, the systemic and stochastic error calculations can be used to improve the effectiveness of an object tracking system. FIG. 8A is a flowchart showing an example of a process of determining the effective coverage of one or more sensors in an object tracking system (e.g., performed by computer(s) 150, 200, 250, 420, 490, 500, 660). One or more three dimensional trajectories for one or more balls hit into a three dimensional physical space (adjacent a sensor system) are determined 800 based on observations by at least one golf ball sensor placed adjacent to the three dimensional physical space.

Systemic and stochastic errors are calculated 802 for the one or more three dimensional trajectories in accordance with variations in golf ball launching position and/or sensor parameters. In some implementations, a grid-search pattern is used to determine what the errors would be for a range of different hitting locations and shot trajectories. In some implementations, the calculating 802 involves calculating the systemic and stochastic errors for the at least one three dimensional trajectory in accordance with variations in locations for the at least one golf ball sensor. A similar grid-search pattern can be used to determine what the errors would be for a range of different sensor locations and shot trajectories. Moreover, one or more other variations in parameters for the at least one golf ball sensor can be used during the calculating 802.

In general, the sensor parameters include position and field of view. Specific sensor types will have additional parameters, such as beam width for a radar device, which will affect the field of view. For example, a camera based sensor will have a focal length parameter, which affects the field of view along with the orientation (rotation) of the camera, principal point and distortion parameters, different lens properties, and properties of the image capturing element, such as resolution. Different sensor parameters (e.g., different location and/or different fields of view) that improve the systemic and stochastic errors for the sensor system can be identified 804. For example, at least one different location for the at least one golf ball sensor that produces lower systemic and stochastic errors can be identified 804. As another example, different fields of view for one or more golf ball sensors can be identified 804, where these different fields of view are variations in initial fields of view that produce lower systemic and stochastic errors than those initial fields of view.

A report is prepared 806, e.g., using lowest values of the systemic and stochastic errors for available tee locations. In some implementations, the prepared report shows the different, improved sensor parameters. For example, the report can be prepared to show a summary of the calculated systemic and stochastic errors to indicate the at least one different location for the at least one golf ball sensor. Moreover, when there is more than one sensor in the system, the report can be prepared 806 using lowest values of the systemic and stochastic errors, as calculated for the at least two golf ball sensors, for each available tee location.

Figure 8B:
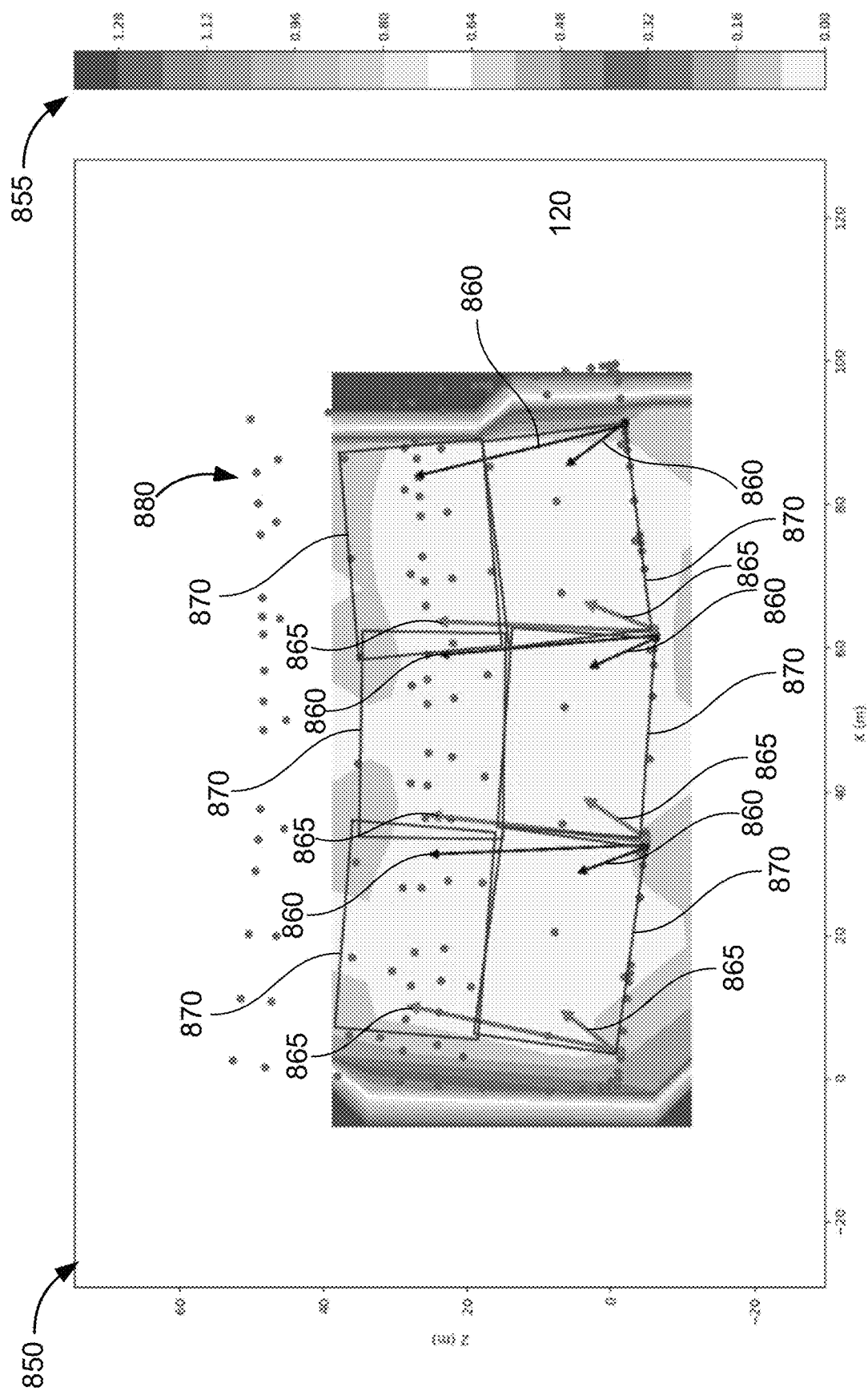
FIG. 8B shows an example of a map of errors for a deployed object tracking system.

The report is presented 808 to indicate preferred hitting positions and/or to indicate the different, improved sensor parameters that can be used with the sensor system. FIG. 8B shows an example of a map of errors 850 for a deployed object tracking system. The map 850 shows the sum of the estimated systemic and stochastic errors for a typical golf shot, when hit from different positions on the grass tee. It's a top-down view of the grass tee, where each position is colored (or otherwise indicated) according to the error, as defined by the bar 855 on the side. This map 850 can be used by the golfer selecting a tee position, and this map 850 can also be used by the person deciding where the sensor(s) of the object tracking system should be placed. In the latter case, the person can input the camera positions and rotations, and a new map can be generated. This map can then be used to determine if the sensor placement is good enough, and whether or not the whole grass tee is covered with the planned system, and different sensor positions and rotations can be tested on this aspect.

This example is displaying the expected error values for certain locations on a grass tee, which allows a range owner to physically mark areas on the grass tee where the reliability is better, customers to choose a hitting location that has better expected reliability, or both. This map can be calculated by dividing the grass tee into smaller regions, and calculating the "bay error" for a "typical shot" for each of these regions, taking into account when these shots would enter the field of view of each sensor when hit from this position when determining the parameters that go into the equations for calculating the systemic and stochastic errors. If there is more than one tracking system with different sensors, the error can be computed for each of the systems, and the lowest of these values can be used on the map.

In the map 850, the arrows 860, 865 indicate the current positions of the cameras, which were used to determine the launching location errors for each position. The length of the arrows indicate the focal length of the cameras—longer arrow, longer focal length (and shorter field of view). The direction of the arrows 860, 865 indicate the direction each camera is aimed. The base of the arrow is the camera position. The dots 880 indicate measured positions on the grass tee. When measuring a grass tee, a number of points can be defined in it that should be measured in order to determine the shape and geometry of it. The rectangles 870 visualize areas on the grass tee, representing the main areas that each camera system is expected to track within. Note that these features are included to help the user navigate the map, and put the map in a context. If other landmarks are measured, those can also be added to the map, to help in understanding the context.

Note that a similar map of errors can be generated using variations in sensor placement as opposed to using variations in hitting position. Thus, this type of map can be used to virtually experiment with different sensor locations and directions, to understand the pros and cons for different sensor mounting locations, from a launch location error perspective. In this case, different maps for different sensor locations and directions can be created, e.g., in a dynamic mapping and sensor reconfiguration process. Thus, a range owner can be given guidance regarding how many sensors to deploy in which specific locations for an object tracking system in relation to a given unstructured environment (e.g. a grass tee, thereby improving coverage in the environment, reducing the cost of the deployed system (by reducing the number of sensors needed) in relation to the achieved reliability, or both.

Returning to FIG. 8A, the sensor system can be changed 810 to use one or more of the different sensor parameters. For example, the least one golf ball sensor can be moved 810 to the at least one different location indicated by the report. As another example, the initial field(s) of view of the golf ball sensors can be adjusted 810 to be the different fields of view. Note that testing and changing the sensor system in this manner (to minimize the stochastic and systemic errors) can improve the reliability and coverage of the object tracking system, e.g., for a grass tee area. This holds true whether the object tracking system uses camera sensors and/or other types of sensor devices, such as a radar device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims and/or within the scope of the teachings of the present application. For example, the description above focuses on tracking a golf ball shot, but the systems and techniques described are also applicable to other types of object/projectile flight tracking, such as for baseball or skeet shooting, as well as non-sports applications. In addition, the actions recited in the claims can be performed in a different order and still achieve desirable results.

What is claimed is:

1. A system comprising:
    two or more defined physical locations from which golf balls are hit into a three dimensional physical space;
    one or more golf ball sensors arranged with respect to the three dimensional physical space to detect the golf balls in flight after the golf balls are hit into the three dimensional physical space from the two or more defined physical locations; and
    one or more computers communicatively coupled with the one or more golf ball sensors, the one or more computers comprising at least one hardware processor and at least one memory device coupled with the at least one hardware processor, the at least one memory device encoding instructions configured to cause the at least one hardware processor to perform operations comprising:
        determining a three dimensional trajectory for a golf ball in the three dimensional physical space based on initial observations of the golf ball by the one or more golf ball sensors,
        extrapolating the three dimensional trajectory of the golf ball backward in time to generate an extrapolated trajectory,
        calculating one or more distance measures between the extrapolated trajectory and the two or more defined physical locations,
        determining one of the two or more defined physical locations to be an origin of the golf ball based on the one or more distance measures and two types of separately estimated errors, wherein a first of the two types of separately estimated errors affects ball positional error for the initial observations, and a second of the two types of separately estimated errors affects an angle of the extrapolated trajectory, and
        presenting golf ball data on a display device associated with the origin of the golf ball.

2. The system of claim 1, wherein the presenting comprises presenting one or more metrics for the golf ball in flight in the three dimensional physical space based on the two types of separately estimated errors.

3. The system of claim 2, wherein the presenting one or more metrics comprises:
    computing a measure of error for ball speed using the second of the two types of separately estimated errors; and
    presenting, on the display device, a ball speed value calculated for the three dimensional trajectory for the golf ball when the measure of error for ball speed is below a threshold.

4. The system of claim 2, wherein the presenting one or more metrics comprises:
    computing a measure of error for a ball spin vector using the two types of separately estimated errors; and
    presenting, on the display device, a ball spin value calculated for the three dimensional trajectory for the golf ball when the measure of error for the ball spin vector is below a threshold.

5. The system of claim 2, wherein the presenting one or more metrics comprises:
    computing a measure of error for launch angle using the two types of separately estimated errors; and
    presenting, on the display device, a launch angle calculated for the three dimensional trajectory for the golf ball when the measure of error for launch angle is below a threshold.

6. The system of claim 2, wherein the presenting comprises presenting a golf shot animation or a ball tracing overlay for the golf ball in flight in the three dimensional physical space.

7. The system of claim 1, wherein calculating the one or more distance measures comprises checking for intersections between the extrapolated trajectory and geometric shapes representing the two or more defined physical locations.

8. The system of claim 7, wherein the geometric shapes are three dimensional shapes.

9. The system of claim 1, wherein the operations comprise:
    determining hitting positions for two or more golfers to define the two or more defined physical locations from which golf balls are hit into the three dimensional physical space.

10. The system of claim 9, wherein determining the hitting positions comprises using input from at least one electronic location system that communicates with mobile devices of the two or more golfers.

11. The system of claim 10, wherein determining the hitting positions comprises:
    locating a position of a mobile device of a given golfer using the at least one electronic location system;
    offsetting the position of the mobile device in a first direction responsive to the given golfer being right handed, to determine a hitting position for the given golfer; and
    offsetting the position of the mobile device in a second direction, which is opposite the first direction, responsive to the given golfer being left handed, to determine the hitting position for the given golfer.

12. The system of claim 10, wherein determining the hitting positions comprises using sensor data for one or more test shots by each of the two or more golfers.

13. A method comprising:
    determining a three dimensional trajectory for a golf ball in a three dimensional physical space based on initial observations of the golf ball by one or more golf ball sensors;
    extrapolating the three dimensional trajectory of the golf ball backward in time to generate an extrapolated trajectory;
    calculating one or more distance measures between the extrapolated trajectory and each of the two or more defined physical locations;
    determining one of the two or more defined physical locations to be an origin of the golf ball based on the one or more distance measures and two types of separately estimated errors, wherein a first of the two types of separately estimated errors affects ball positional error for the initial observations, and a second of the two types of separately estimated errors affects an angle of the extrapolated trajectory; and presenting golf ball data on a display device associated with the origin of the golf ball.

14. The method of claim 13, wherein the presenting comprises presenting one or more metrics for the golf ball in flight in the three dimensional physical space based on the two types of separately estimated errors.

15. The method of claim 14, wherein the presenting one or more metrics comprises:

computing a measure of error for ball speed using the second of the two types of separately estimated errors; and presenting, on the display device, a ball speed value calculated for the three dimensional trajectory for the golf ball when the measure of error for ball speed is below a threshold.

16. The method of claim 14, wherein the presenting one or more metrics comprises:

computing a measure of error for a ball spin vector using the two types of separately estimated errors; and presenting, on the display device, a ball spin value calculated for the three dimensional trajectory for the golf ball when the measure of error for the ball spin vector is below a threshold.

17. The method of claim 14, wherein the presenting one or more metrics comprises:

computing a measure of error for launch angle using the two types of separately estimated errors; and presenting, on the display device, a launch angle calculated for the three dimensional trajectory for the golf ball when the measure of error for launch angle is below a threshold.

18. The method of claim 14, wherein the presenting comprises presenting a golf shot animation or a ball tracing overlay for the golf ball in flight in the three dimensional physical space.

19. The method of claim 13, wherein calculating the one or more distance measures comprises checking for intersections between the extrapolated trajectory and geometric shapes representing the two or more defined physical locations.

20. The method of claim 19, wherein the geometric shapes are three dimensional shapes.

21. The method of claim 13, wherein the operations comprise:

determining hitting positions for two or more golfers to define the two or more defined physical locations from which golf balls are hit into the three dimensional physical space.

22. The method of claim 21, wherein determining the hitting positions comprises using input from at least one electronic location system that communicates with mobile devices of the two or more golfers.

23. The method of claim 22, wherein determining the hitting positions comprises:

locating a position of a mobile device of a given golfer using the at least one electronic location system; and offsetting the position of the mobile device in a first direction responsive to the given golfer being right handed, to determine a hitting position for the given golfer, or offsetting the position of the mobile device in a second direction, which is opposite the first direction, responsive to the given golfer being left handed, to determine the hitting position for the given golfer.

24. The method of claim 22, wherein determining the hitting positions comprises using sensor data for one or more test shots by each of the two or more golfers.

\* \* \* \* \*